US012775515B1

(12) United States Patent
Curtis et al.

(10) Patent No.: US 12,775,515 B1
(45) **Date of Patent: *Oct. 27, 2026**

(54) MACHINE-LEARNING BASED PRIORITIZATION OF ALERT GROUPINGS AND RETRAINING THEREOF

(71) Applicant: Cisco Technology, Inc., San Jose, CA (US)

(72) Inventors: Kristal Curtis, San Francisco, CA (US); William Deaderick, Austin, TX (US); Wei Jie Gao, Pincourt (CA); Tanner Gilligan, San Bruno, CA (US); Chandrima Sarkar, Dublin, CA (US); Alexander Sasha Stojanovic, Providence, RI (US); Ralph Donald Thompson, Sammamish, WA (US); Poonam Yadav, San Francisco, CA (US); Sichen Zhong, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/976,155

(22) Filed: Dec. 10, 2024

Related U.S. Application Data

(63) Continuation of application No. 18/208,879, filed on Jun. 12, 2023, now Pat. No. 12,181,956, which is a (Continued)

(51) Int. Cl.

| | |
|---|---|
| ***G06F 11/07*** | (2006.01) |
| ***G06F 18/21*** | (2023.01) |
| ***G06F 18/214*** | (2023.01) |

(52) U.S. Cl.

CPC ...... *G06F 11/0781* (2013.01); *G06F 11/0769* (2013.01); *G06F 18/214* (2023.01); *G06F 18/2178* (2023.01)

(58) Field of Classification Search

CPC ......................... G06F 11/0789; G06F 11/0769

(Continued)

(56) References Cited

U.S. PATENT DOCUMENTS

| | | | |
|---|---|---|---|
| 6,839,680 | B1 | 1/2005 | Liu et al. |
| 7,937,344 | B2 | 5/2011 | Baum et al. |

(Continued)

OTHER PUBLICATIONS

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

(Continued)

*Primary Examiner* — Chae M Ko

(74) *Attorney, Agent, or Firm* — Rutan & Tucker, LLP; Kyle M. St. James

(57) ABSTRACT

Systems and methods are disclosed that are directed to improving the prioritization and viewing of system alerts through the use of machine learning to group the alerts and prioritize the groupings. Additionally, a graphical user interface (GUI) is generated that illustrates the prioritized listing of the plurality of groupings. Thus, a system administrator or other user receives an improved experience as the number of notifications provided to the system administrator are reduced due to the grouping of individual alerts into related groupings and further due to the prioritization of the groupings. Additionally, user feedback may be obtained through user interaction with GUI, where the user feedback comprises either explicit feedback or implicit feedback. The (Continued)

machine learning model may then be retrained based on the user feedback.

17 Claims, 21 Drawing Sheets

Related U.S. Application Data continuation of application No. 17/587,877, filed on Jan. 28, 2022, now Pat. No. 11,714,698.

(58) Field of Classification Search
USPC .............................................. 714/48, 26, 57
See application file for complete search history.

(56) References Cited

U.S. PATENT DOCUMENTS

| | | | |
|---|---|---|---|
| 8,112,425 | B2 | 2/2012 | Baum et al. |
| 8,751,529 | B2 | 6/2014 | Zhang et al. |
| 8,788,525 | B2 | 7/2014 | Neels et al. |
| 9,069,737 | B1 | 6/2015 | Kimotho et al. |
| 9,215,240 | B2 | 12/2015 | Merza et al. |
| 9,286,413 | B1 | 3/2016 | Coates et al. |
| 10,127,258 | B2 | 11/2018 | Lamas et al. |
| 10,261,851 | B2 | 4/2019 | Velipasaoglu et al. |
| 10,484,257 | B1 | 11/2019 | Louca et al. |
| 10,713,321 | B1 | 7/2020 | Wen et al. |
| 11,003,766 | B2 * | 5/2021 | Kraus ...................... G06N 3/08 |
| 11,586,826 | B2 | 2/2023 | Kehler |
| 11,595,334 | B1 | 2/2023 | Horesh et al. |
| 11,714,698 | B1 | 8/2023 | Curtis et al. |
| 12,181,956 | B1 | 12/2024 | Curtis et al. |
| 2012/0131139 | A1 | 5/2012 | Siripurapu et al. |
| 2016/0147583 | A1 | 5/2016 | Ben Simhon et al. |
| 2016/0217022 | A1 | 7/2016 | Velipasaoglu et al. |
| 2017/0063912 | A1 | 3/2017 | Muddu et al. |
| 2017/0279834 | A1 * | 9/2017 | Vasseur ................. H04L 41/147 |
| 2018/0131655 | A1 * | 5/2018 | Carbune ................ G06Q 10/40 |
| 2018/0205793 | A1 | 7/2018 | Loeb et al. |
| 2018/0241762 | A1 * | 8/2018 | Savalle .................. G06N 3/006 |
| 2018/0365090 | A1 | 12/2018 | Ben Simhon et al. |
| 2019/0098106 | A1 | 3/2019 | Mungel et al. |
| 2020/0057850 | A1 | 2/2020 | Kraus et al. |
| 2020/0244673 | A1 | 7/2020 | Stockdale et al. |
| 2020/0334809 | A1 * | 10/2020 | Vianu .................. G06V 30/333 |
| 2022/0070182 | A1 | 3/2022 | Bowditch et al. |
| 2022/0101270 | A1 * | 3/2022 | Tenneti ............... G06F 11/0751 |
| 2022/0123552 | A1 * | 4/2022 | Pathak .................... H02J 3/001 |
| 2023/0066046 | A1 | 3/2023 | Wolff Westrup et al. |

OTHER PUBLICATIONS

Carraso, David, “Exploring Splunk,” published by CITO Research, New York, NY, Apr. 2012.
Splunk Cloud 8.0.2004 User Manual, available online, retrieved May 20, 2020 from docs.splunk.com.
Splunk Enterprise 8.0.0 Overview, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.

* cited by examiner

302

302A

```
127.0.0.1 – eva [10/Oct/2000:13:55:36-0700] "GET/apache.gif HTTP/1.0" 200  2326  0.0947
127.0.0.1 – emerson [10/Oct/2000:13:56:36-0700] "GET/eastwood.gif HTTP/1.0" 200 2980
0.0899
```

302C 302B

```
127.0.0.3 – eliza [10/Oct/2000:13:57:36-0700] "GET/ezra.gif HTTP/1.0" 200 2900 0.0857
[Sunday Oct 10 1:58:33 2010] [error] [client 127.10.1.1.015] File does not exist: /home/emmeline/
pub_html/images/alisia.gif
```

302E 302D

```
91.205.189.15 - - [28/Apr/2014:18:22:16] "GET /oldlink?itemId=EST-
14&JSESSIONID=SD6SL7FF7ADFF53113 HTTP 1.1" 200 1665 "http://
www.buttercupgames.com/oldlink?itemId=EST-14" "Mozilla/5.0 (Windwos NT 6.1; WOW 64)
AppleWebKit/536.5 (KHTML, like Gecko) Chrome/19.0.1084.46 Safari/536.5" 159
```

304

```
  docker: {
        container_id: f7360a148a670c4c257f4ee024be81284b6017d72ae41ea8ee5d
  }
  kubernetes: {
        container_name: kube-apiserver
        host: ip-172-20-43-173.ec2.internal
        labels: {
          k8s-app: kube-apiserver
        }
  master_url: https://100.64.0.1:443/api
  namespace_id: e5af26aa-4ef9-11e8-a4e1-0a2bf2ab4bba
  namespace_name: kube-system
  pod_id: 0a73017b-4efa-11e8-a4e1-0a2bf2ab4bba
  pod_name: kube-apiserver-ip-172-20-43-173.ec2.internal
  }
  log: I0503 23:04:12.595203     1 wrap.go:42] GET /apis/admissionregistrations.k8s.io/v1beta1/
validatingwebhookconfiguration 200 [[kube-apiserver/v1.9.3 (linux/amd64) kubernetes/d283541]
127.0.0.1:55026

  stream: stdout
  time: 2018-05-03T23:04:12.619948395Z
}
```

304A 304B

306

| time | ID | CPU | memory |
|---|---|---|---|
| 10/10/00 12:01:00.013 | eliza | 14% | 80% |
| 10/10/00 12:01:05.153 | eva | 26% | 70% |

*FIG. 3A*

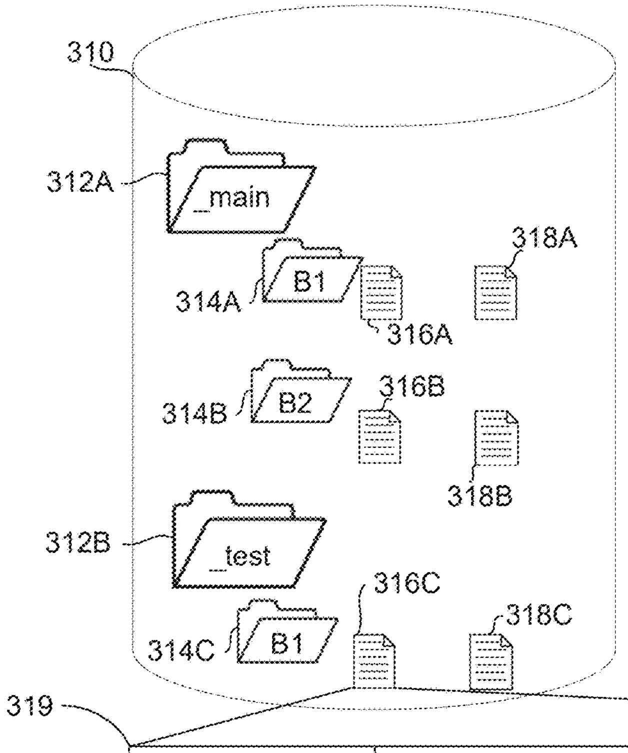

| | Time 332 | Machine Data 330 | Host 334 | Source 336 | Sourcetype 338 |
|---|---|---|---|---|---|
| 320 | 10/10/2000 1:55 p.m. | 127.0.0.1 -- eva [10/Oct/2000:13:55:36-0700] "GET/apache.gif HTTP/1.0" 200 2326 0.0947 (1140, 1141, 1142, 1143, 1144, 1145, 1146) | www1 | access.log | access_combined |
| 322 | 10/10/2000 1:56 p.m. | 127.0.0.1 -- emerson [10/Oct/2000:13:56:36-0700] "GET/eastwood.gif HTTP/1.0" 200 2980 0.0899 | www2 | access.log | access_combined |
| 324 | 10/10/2000 1:57 p.m. | 127.0.0.3 -- eliza [10/Oct/2000:13:57:36-0700] "GET/ezra.gif HTTP/1.0" 200 2900 0.0857 | www2 | access.log | access_combined |
| 326 | 10/10/2000 1:58 p.m. | [Sunday Oct 10 1:58:33 2010] [error] [client 127.10.1.1.015] File does not exist: /home/emmeline/pub_html/images/alisia.gif | www2 | error.log | apache_error |

*FIG. 3B*

MACHINE-LEARNING BASED PRIORITIZATION OF ALERT GROUPINGS AND RETRAINING THEREOF

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it. Although the availability of vastly greater amounts of diverse data on diverse data systems provides opportunities to derive new insights, it also gives rise to technical challenges to search and analyze the data in a performant way.

Due to this increased dependency on data systems to store passively or actively generated data, it has become increasingly important to closely monitor the operability and health of deployed data systems. While generation of alerts based on the processing of this generated data has provided valuable insight for network administrators, especially as a means to receive notifications pertaining to the operability and health of deployed systems. However, as greater amount of diverse data are stored and processed, the number of alerts often becomes so large that such are no longer as valuable due to the time required to parse through alerts and determine on which to take action, if any.

Conventionally, administrators have been provided a dashboard with these alerts in a randomized manner or in a time sequential manner. However, what is needed is are systems and methods for providing a prioritized listing of such alerts that are configured to receive user feedback and tune the method by which the alerts are prioritized.

BRIEF DESCRIPTION OF THE DRAWINGS

Illustrative examples are described in detail below with reference to the following figures:

FIG. 3A is a block diagram illustrating an embodiment of machine data received by the data intake and query system.

FIGS. 3B and 3C are block diagrams illustrating embodiments of various data structures for storing data processed by the data intake and query system.

DETAILED DESCRIPTION

Figure 1:
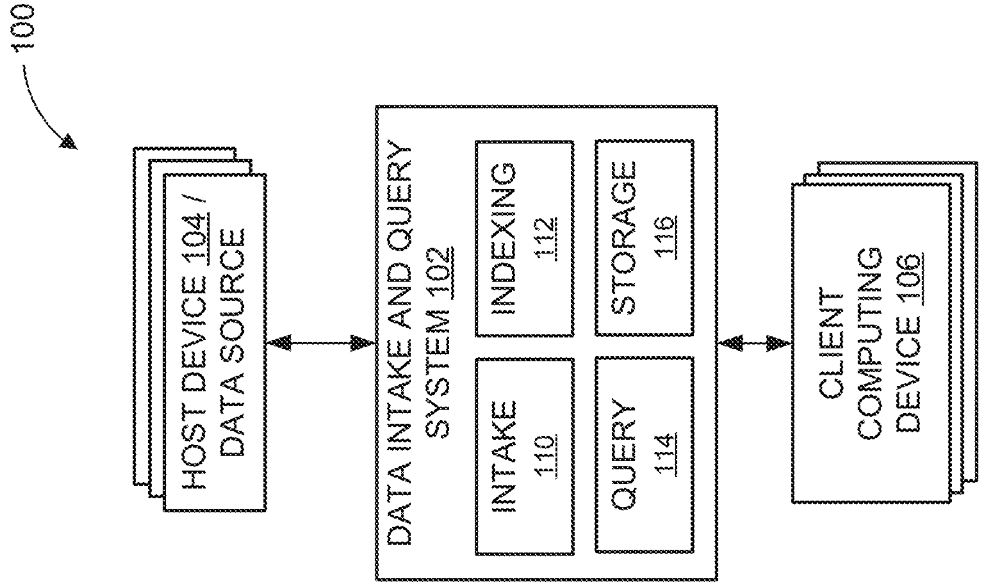
FIG. 1 is a block diagram of an embodiment of a data processing environment.

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that concurrently (i.e. overlapping at least partially in time) report these types of information.

These challenges can be addressed by using an event-based data intake and query system, such as the SPLUNK® ENTERPRISE, SPLUNK® CLOUD, or SPLUNK® CLOUD SERVICE system developed by Splunk Inc. of San Francisco, California. These systems represent the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, metrics data, tracing data, and other data input sources.

In the data intake and query system, machine data is collected and stored as "events." An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp. The time stamp may be derived from the portion of machine data in the event, determined through interpolation between temporally proximate events having known timestamps, and/or may be determined based on other configurable rules for associating timestamps with events.

In some instances, machine data can have a predefined structure, where data items with specific data formats are stored at predefined locations in the data. For example, the machine data may include data associated with fields in a database table. In other instances, machine data may not have a predefined structure (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system can use flexible schema to specify how to extract information from events. A flexible schema may be developed and redefined as needed. The flexible schema can be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp, and stores the events. The system enables users to run queries against the stored events to, for example, retrieve events that meet filter criteria specified in a query, such as criteria indicating certain keywords or having specific values in defined fields. Additional query terms can further process the event data, such as, by transforming the data, etc.

As used herein, the term "field" can refer to a location in the machine data of an event containing one or more values for a specific data item. A field may be referenced by a field name associated with the field. As will be described in more detail herein, in some cases, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file can include one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or sourcetype. When events are to be searched based on a particular field name specified in a search, the system can use one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system can utilize a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from machine data or events. In some cases, an extraction rule comprises a regular expression, where a sequence of characters form a search pattern. An extraction rule comprising a regular expression is referred to herein as a regex rule. The system applies a regex rule to machine data or an event to extract values for a field associated with the regex rule, where the values are extracted by searching the machine data/event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources.

In some embodiments, the configuration files and/or extraction rules described above can be stored in a catalog, such as a metadata catalog. In certain embodiments, the content of the extraction rules can be stored as rules or actions in the metadata catalog. For example, the identification of the data to which the extraction rule applies can be referred to a rule and the processing of the data can be referred to as an action.

1.0. Operating Environment

FIG. 1 is a block diagram of an embodiment of a data processing environment 100. In the illustrated embodiment, the environment 100 includes a data intake and query system 102, one or more host devices 104, and one or more client computing devices 106 (generically referred to as client device(s) 106).

The data intake and query system 102, host devices 104, and client devices 106 can communicate with each other via one or more networks, such as a local area network (LAN), wide area network (WAN), private or personal network, cellular networks, intranetworks, and/or internetworks using any of wired, wireless, terrestrial microwave, satellite links, etc., and may include the Internet. Although not explicitly shown in FIG. 1, it will be understood that a client computing device 106 can communicate with a host device 104 via one or more networks. For example, if the host device 104 is configured as a web server and the client computing device 106 is a laptop, the laptop can communicate with the web server to view a website.

1.1. Client Devices

A client device 106 can correspond to a distinct computing device that can configure, manage, or sends queries to the system 102. Examples of client devices 106 may include, without limitation, smart phones, tablet computers, handheld computers, wearable devices, laptop computers, desktop computers, servers, portable media players, gaming devices, or other device that includes computer hardware (e.g., processors, non-transitory storage medium, etc.) and so forth. In certain cases, a client device 106 can include a hosted, virtualized, or containerized device, such as an isolated execution environment, that shares computing resources (e.g., processor, memory, etc.) of a particular machine with other isolated execution environments.

The client devices 106 can interact with the system 102 (or a host device 104) in a variety of ways. For example, the client devices 106 can communicate with the system 102 (or a host device 104) over an Internet (Web) protocol, via a gateway, via a command line interface, via a software developer kit (SDK), a standalone application, etc. As another example, the client devices 106 can use one or more executable applications or programs to interface with the system 102.

1.2. Host Devices

A host device 104 can correspond to a distinct computing device or system that includes or has access to data that can be ingested, indexed, and/or searched by the system 102. Accordingly, in some cases, a client device 106 may also be a host device 104 (e.g., it can include data that is ingested by the system 102 and it can submit queries to the system 102). The host devices 104 can include, but are not limited to, servers, sensors, routers, personal computers, mobile devices, internet of things (IoT) devices, or hosting devices, such as computing devices in a shared computing resource environment on which multiple isolated execution environment (e.g., virtual machines, containers, etc.) can be instantiated, or other computing devices in an IT environment (e.g., device that includes computer hardware, e.g., processors, non-transitory storage medium). In certain cases, a host device 104 can include a hosted, virtualized, or containerized device, such as an isolated execution environment, that shares computing resources (e.g., processor, memory, etc.) of a particular machine (e.g., a hosting device or hosting machine) with other isolated execution environments.

As mentioned host devices 104 can include or have access to data sources for the system 102. The data sources can include machine data found in log files, data files, distributed file systems, streaming data, publication-subscribe (pub/sub) buffers, directories of files, data sent over a network, event logs, registries, streaming data services (examples of which can include, by way of non-limiting example, Amazon's Simple Queue Service ("SQS") or Kinesis™ services, devices executing Apache Kafka™ software, or devices implementing the Message Queue Telemetry Transport (MQTT) protocol, Microsoft Azure EventHub, Google Cloud PubSub, devices implementing the Java Message Service (JMS) protocol, devices implementing the Advanced Message Queuing Protocol (AMQP)), cloud-based services (e.g., AWS, Microsoft Azure, Google Cloud, etc.), operating-system-level virtualization environments (e.g., Docker), container orchestration systems (e.g., Kubernetes), virtual machines using full virtualization or paravirtualization, or other virtualization technique or isolated execution environments.

In some cases, one or more applications executing on a host device may generate various types of machine data during operation. For example, a web server application executing on a host device 104 may generate one or more web server logs detailing interactions between the web server and any number of client devices 106 or other devices. As another example, a host device 104 implemented as a router may generate one or more router logs that record information related to network traffic managed by the router. As yet another example, a database server application executing on a host device 104 may generate one or more logs that record information related to requests sent from other devices (e.g., web servers, application servers, client devices, etc.) for data managed by the database server. Similarly, a host device 104 may generate and/or store computing resource utilization metrics, such as, but not limited to, CPU utilization, memory utilization, number of processes being executed, etc. Any one or any combination of the files or data generated in such cases can be used as a data source for the system 102.

In some embodiments, an application may include a monitoring component that facilitates generating performance data related to host device's operating state, including monitoring network traffic sent and received from the host device and collecting other device and/or application-specific information. A monitoring component may be an integrated component of the application, a plug-in, an extension, or any other type of add-on component, or a stand-alone process.

Such monitored information may include, but is not limited to, network performance data (e.g., a URL requested, a connection type (e.g., HTTP, HTTPS, etc.), a connection start time, a connection end time, an HTTP status code, request length, response length, request headers, response headers, connection status (e.g., completion, response time(s), failure, etc.)) or device performance information (e.g., current wireless signal strength of the device, a current connection type and network carrier, current memory performance information, processor utilization, memory utilization, a geographic location of the device, a device orientation, and any other information related to the operational state of the host device, etc.), device profile information (e.g., a type of client device, a manufacturer, and model of the device, versions of various software applications installed on the device, etc.) In some cases, the monitoring component can collect device performance information by monitoring one or more host device operations, or by making calls to an operating system and/or one or more other applications executing on a host device for performance information. The monitored information may be stored in one or more files and/or streamed to the system 102.

In general, a monitoring component may be configured to generate performance data in response to a monitor trigger in the code of a client application or other triggering application event, as described above, and to store the performance data in one or more data records. Each data record, for example, may include a collection of field-value pairs, each field-value pair storing a particular item of performance data in association with a field for the item. For example, a data record generated by a monitoring component may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data. Examples of functionality that enables monitoring performance of a host device are described in U.S. patent application Ser. No. 14/524,748, entitled "UTILIZ- ING PACKET HEADERS TO MONITOR NETWORK TRAFFIC IN ASSOCIATION WITH A CLIENT DEVICE," filed on 27 Oct. 2014, and which is hereby incorporated by reference in its entirety for all purposes.

In some embodiments, such as in a shared computing resource environment (or hosted environment), a host device 104 may include logs or machine data generated by an application executing within an isolated execution environment (e.g., web server log file if the isolated execution environment is configured as a web server or database server log files if the isolated execution environment is configured as database server, etc.), machine data associated with the computing resources assigned to the isolated execution environment (e.g., CPU utilization of the portion of the CPU allocated to the isolated execution environment, memory utilization of the portion of the memory allocated to the isolated execution environment, etc.), logs or machine data generated by an application that enables the isolated execution environment to share resources with other isolated execution environments (e.g., logs generated by a Docker manager or Kubernetes manager executing on the host device 104), and/or machine data generated by monitoring the computing resources of the host device 104 (e.g., CPU utilization, memory utilization, etc.) that are shared between the isolated execution environments. Given the separation (and isolation) between isolated execution environments executing on a common computing device, in certain embodiments, each isolated execution environment may be treated as a separate host device 104 even if they are, in fact, executing on the same computing device or hosting device.

Accordingly, as used herein, obtaining data from a data source may refer to communicating with a host device 104 to obtain data from the host device 104 (e.g., from one or more data source files, data streams, directories on the host device 104, etc.). For example, obtaining data from a data source may refer to requesting data from a host device 104 and/or receiving data from a host device 104. In some such cases, the host device 104 can retrieve and return the requested data from a particular data source and/or the system 102 can retrieve the data from a particular data source of the host device 104 (e.g., from a particular file stored on a host device 104).

1.4. Data Intake and Query System Overview

The data intake and query system 102 can ingest, index, and/or store data from heterogeneous data sources and/or host devices 104. For example, the system 102 can ingest, index, and/or store any type of machine data, regardless of the form of the machine data or whether the machine data matches or is similar to other machine data ingested, indexed, and/or stored by the system 102. In some cases, the system 102 can generate events from the received data, group the events, and store the events in buckets. The system 102 can also search heterogeneous data that it has stored or search data stored by other systems (e.g., other system 102 systems or other non-system 102 systems). For example, in response to received queries, the system 102 can assign one or more components to search events stored in the storage system or search data stored elsewhere.

As will be described herein in greater detail below, the system 102 can use one or more components to ingest, index, store, and/or search data. In some embodiments, the system 102 is implemented as a distributed system that uses multiple components to perform its various functions. For example, the system 102 can include any one or any combination of an intake system 110 (including one or more components) to ingest data, an indexing system 112 (including one or more components) to index the data, a storage system 116 (including one or more components) to store the data, and/or a query system 114 (including one or more components) to search the data, etc.

In the illustrated embodiment, the system 102 is shown having four systems: 110, 112, 114, and 116. However, it will be understood that the system 102 may include any one or any combination of the intake system 110, indexing system 112, query system 114, or storage system 116. Further, in certain embodiments, one or more of the intake system 110, indexing system 112, query system 114, or storage system 116 may be used alone or apart from the system 102. For example, the intake system 110 may be used alone to glean information from streaming data that is not indexed or stored by the system 102, or the query system 114 may be used to search data that is unaffiliated with the system 102.

In certain embodiments, the components of the different systems may be distinct from each other or there may be some overlap. For example, one component of the system 102 may include some indexing functionality and some searching functionality and thus be used as part of the indexing system 112 and query system 114, while another computing device of the system 102 may only have ingesting or search functionality and only be used as part of those respective systems. Similarly, the components of the storage system 116 may include data stores of individual components of the indexing system and/or may be a separate shared data storage system, like Amazon S3, that is accessible to distinct components of the intake system 110, indexing system 112, and query system 114.

In some cases, the components of the system 102 are implemented as distinct computing devices having their own computer hardware (e.g., processors, non-transitory storage medium) and/or as distinct hosted devices (e.g., isolated execution environments) that share computing resources or hardware in a shared computing resource environment.

For simplicity, references made herein to the intake system 110, indexing system 112, storage system 116, and query system 114 can refer to those components used for ingesting, indexing, storing, and searching, respectively. However, it will be understood that although reference is made to two separate systems, the same underlying component may be performing the functions for the two different systems. For example, reference to the indexing system indexing data and storing the data in the storage system 116 or the query system searching the data may refer to the same component (e.g., same computing device or hosted device) indexing the data, storing the data, and then searching the data that it stored.

1.4.1. Intake System Overview

As will be described in greater detail herein, the intake system 110 can receive data from the host devices 104 or data sources, perform one or more preliminary processing operations on the data, and communicate the data to the indexing system 112, query system 114, storage system 116, or to other systems (which may include, for example, data processing systems, telemetry systems, real-time analytics systems, data stores, databases, etc., any of which may be operated by an operator of the system 102 or a third party). Given the amount of data that can be ingested by the intake system 110, in some embodiments, the intake system can include multiple distributed computing devices or components working concurrently to ingest the data.

The intake system 110 can receive data from the host devices 104 in a variety of formats or structures. In some embodiments, the received data corresponds to raw machine data, structured or unstructured data, correlation data, data files, directories of files, data sent over a network, event logs, registries, messages published to streaming data sources, performance metrics, sensor data, image and video data, etc.

The preliminary processing operations performed by the intake system 110 can include, but is not limited to, associating metadata with the data received from a host device 104, extracting a timestamp from the data, identifying individual events within the data, extracting a subset of machine data for transmittal to the indexing system 112, enriching the data, etc. As part of communicating the data to the indexing system, the intake system 110 can route the data to a particular component of the intake system 110 or dynamically route the data based on load-balancing, etc. In certain cases, one or more components of the intake system 110 can be installed on a host device 104.

1.4.2. Indexing System Overview

As will be described in greater detail herein, the indexing system 112 can include one or more components (e.g., indexing nodes) to process the data and store it, for example, in the storage system 116. As part of processing the data, the indexing system can identify distinct events within the data, timestamps associated with the data, organize the data into buckets or time series buckets, convert editable buckets to non-editable buckets, store copies of the buckets in the storage system 116, merge buckets, generate indexes of the data, etc. In addition, the indexing system 112 can update various catalogs or databases with information related to the buckets (pre-merged or merged) or data that is stored in the storage system 116, and can communicate with the intake system 110 about the status of the data storage.

1.4.3. Query System Overview

As will be described in greater detail herein, the query system 114 can include one or more components to receive, process, and execute queries. In some cases, the query system 114 can use the same component to process and execute the query or use one or more components to receive and process the query (e.g., a search head) and use one or more other components to execute at least a portion of the query (e.g., search nodes). In some cases, a search node and an indexing node may refer to the same computing device or hosted device performing different functions. In certain cases, a search node can be a separate computing device or hosted device from an indexing node.

Queries received by the query system 114 can be relatively complex and identify a set of data to be processed and a manner of processing the set of data from one or more client devices 106. In certain cases, the query can be implemented using a pipelined command language or other query language. As described herein, in some cases, the query system 114 can execute parts of the query in a distributed fashion (e.g., one or more mapping phases or parts associated with identifying and gathering the set of data identified in the query) and execute other parts of the query on a single component (e.g., one or more reduction phases). However, it will be understood that in some cases multiple components can be used in the map and/or reduce functions of the query execution.

In some cases, as part of executing the query, the query system 114 can use one or more catalogs or databases to identify the set of data to be processed or its location in the storage system 116 and/or can retrieve data from the storage system 116. In addition, in some embodiments, the query system 114 can store some or all of the query results in the storage system 116.

1.4.4. Storage System Overview

In some cases, the storage system 116 may include one or more data stores associated with or coupled to the components of the indexing system 112 that are accessible via a system bus or local area network. In certain embodiments, the storage system 116 may be a shared storage system 116, like Amazon S3 or Google Cloud Storage, that are accessible via a wide area network.

As mentioned and as will be described in greater detail below, the storage system 116 can be made up of one or more data stores storing data that has been processed by the indexing system 112. In some cases, the storage system includes data stores of the components of the indexing system 112 and/or query system 114. In certain embodiments, the storage system 116 can be implemented as a shared storage system 116. The shared storage system 116 can be configured to provide high availability, highly resilient, low loss data storage. In some cases, to provide the high availability, highly resilient, low loss data storage, the shared storage system 116 can store multiple copies of the data in the same and different geographic locations and across different types of data stores (e.g., solid state, hard drive, tape, etc.). Further, as data is received at the shared storage system 116 it can be automatically replicated multiple times according to a replication factor to different data stores across the same and/or different geographic locations. In some embodiments, the shared storage system 116 can correspond to cloud storage, such as Amazon Simple Storage Service (S3) or Elastic Block Storage (EBS), Google Cloud Storage, Microsoft Azure Storage, etc.

In some embodiments, indexing system 112 can read to and write from the shared storage system 116. For example, the indexing system 112 can copy buckets of data from its local or shared data stores to the shared storage system 116. In certain embodiments, the query system 114 can read from, but cannot write to, the shared storage system 116. For example, the query system 114 can read the buckets of data stored in shared storage system 116 by the indexing system 112, but may not be able to copy buckets or other data to the shared storage system 116. In some embodiments, the intake system 110 does not have access to the shared storage system 116. However, in some embodiments, one or more components of the intake system 110 can write data to the shared storage system 116 that can be read by the indexing system 112.

As described herein, in some embodiments, data in the system 102 (e.g., in the data stores of the components of the indexing system 112, shared storage system 116, or search nodes of the query system 114) can be stored in one or more time series buckets. Each bucket can include raw machine data associated with a timestamp and additional information about the data or bucket, such as, but not limited to, one or more filters, indexes (e.g., TSIDX, inverted indexes, keyword indexes, etc.), bucket summaries, etc. In some embodiments, the bucket data and information about the bucket data is stored in one or more files. For example, the raw machine data, filters, indexes, bucket summaries, etc. can be stored in respective files in or associated with a bucket. In certain cases, the group of files can be associated together to form the bucket.

1.4.5. Other Components of the Data Intake and Query System

The system 102 can include additional components that interact with any one or any combination of the intake system 110, indexing system 112, query system 114, and/or storage system 116. Such components may include, but are not limited to an authentication system, orchestration system, one or more catalogs or databases, a gateway, etc.

An authentication system can include one or more components to authenticate users to access, use, and/or configure the system 102. Similarly, the authentication system can be used to restrict what a particular user can do on the system 102 and/or what components or data a user can access, etc.

An orchestration system can include one or more components to manage and/or monitor the various components of the system 102. In some embodiments, the orchestration system can monitor the components of the system 102 to detect when one or more components has failed or is unavailable and enable the system 102 to recover from the failure (e.g., by adding additional components, fixing the failed component, or having other components complete the tasks assigned to the failed component). In certain cases, the orchestration system can determine when to add components to or remove components from a particular system 110, 112, 114, 116 (e.g., based on usage, user/tenant requests, etc.). In embodiments where the system 102 is implemented in a shared computing resource environment, the orchestration system can facilitate the creation and/or destruction of isolated execution environments or instances of the components of the system 102, etc.

In certain embodiments, the system 102 can include various components that enable it to provide stateless services or enable it to recover from an unavailable or unresponsive component without data loss in a time efficient manner. For example, the system 102 can store contextual information about its various components in a distributed way such that if one of the components becomes unresponsive or unavailable, the system 102 can replace the unavailable component with a different component and provide the replacement component with the contextual information. In this way, the system 102 can quickly recover from an unresponsive or unavailable component while reducing or eliminating the loss of data that was being processed by the unavailable component.

In some embodiments, the system 102 can store the contextual information in a catalog, as described herein. In certain embodiments, the contextual information can correspond to information that the system 102 has determined or learned based on use. In some cases, the contextual information can be stored as annotations (manual annotations and/or system annotations), as described herein.

In certain embodiments, the system 102 can include an additional catalog that monitors the location and storage of data in the storage system 116 to facilitate efficient access of the data during search time. In certain embodiments, such a catalog may form part of the storage system 116.

In some embodiments, the system 102 can include a gateway or other mechanism to interact with external devices or to facilitate communications between components of the system 102. In some embodiments, the gateway can be implemented using an application programming interface (API). In certain embodiments, the gateway can be implemented using a representational state transfer API (REST API).

1.4.6. on-Premise and Shared Computing Resource Environments

In some environments, a user of a system 102 may install and configure, on computing devices owned and operated by the user, one or more software applications that implement some or all of the components of the system 102. For example, with reference to FIG. 1, a user may install a software application on server computers owned by the user and configure each server to operate as one or more components of the intake system 110, indexing system 112, query system 114, shared storage system 116, or other components of the system 102. This arrangement generally may be referred to as an "on-premises" solution. That is, the system 102 is installed and operates on computing devices directly controlled by the user of the system 102. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 102 operate.

In certain embodiments, one or more of the components of the system 102 can be implemented in a shared computing resource environment. In this context, a shared computing resource environment or cloud-based service can refer to a service hosted by one more computing resources that are accessible to end users over a network, for example, by using a web browser or other application on a client device to interface with the remote computing resources. For example, a service provider may provide a system 102 by managing computing resources configured to implement various aspects of the system (e.g., intake system 110, indexing system 112, query system 114, shared storage system 116, other components, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

When implemented in a shared computing resource environment, the underlying hardware (non-limiting examples: processors, hard drives, solid-state memory, RAM, etc.) on which the components of the system 102 execute can be shared by multiple customers or tenants as part of the shared computing resource environment. In addition, when implemented in a shared computing resource environment as a cloud-based service, various components of the system 102 can be implemented using containerization or operating-system-level virtualization, or other virtualization technique. For example, one or more components of the intake system 110, indexing system 112, or query system 114 can be implemented as separate software containers or container instances. Each container instance can have certain computing resources (e.g., memory, processor, etc.) of an underlying hosting computing system (e.g., server, microprocessor, etc.) assigned to it, but may share the same operating system and may use the operating system's system call interface. Each container may provide an isolated execution environment on the host system, such as by providing a memory space of the hosting system that is logically isolated from memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Implementing the system 102 in a shared computing resource environment can provide a number of benefits. In some cases, implementing the system 102 in a shared computing resource environment can make it easier to install, maintain, and update the components of the system 102. For example, rather than accessing designated hardware at a particular location to install or provide a component of the system 102, a component can be remotely instantiated or updated as desired. Similarly, implementing the system 102 in a shared computing resource environment or as a cloud-based service can make it easier to meet dynamic demand. For example, if the system 102 experiences significant load at indexing or search, additional compute resources can be deployed to process the additional data or queries. In an "on-premises" environment, this type of flexibility and scalability may not be possible or feasible.

In addition, by implementing the system 102 in a shared computing resource environment or as a cloud-based service can improve compute resource utilization. For example, in an on-premises environment if the designated compute resources are not being used by, they may sit idle and unused. In a shared computing resource environment, if the compute resources for a particular component are not being used, they can be re-allocated to other tasks within the system 102 and/or to other systems unrelated to the system 102.

As mentioned, in an on-premises environment, data from one instance of a system 102 is logically and physically separated from the data of another instance of a system 102 by virtue of each instance having its own designated hardware. As such, data from different customers of the system 102 is logically and physically separated from each other. In a shared computing resource environment, components of a system 102 can be configured to process the data from one customer or tenant or from multiple customers or tenants. Even in cases where a separate component of a system 102 is used for each customer, the underlying hardware on which the components of the system 102 are instantiated may still process data from different tenants. Accordingly, in a shared computing resource environment, the data from different tenants may not be physically separated on distinct hardware devices. For example, data from one tenant may reside on the same hard drive as data from another tenant or be processed by the same processor. In such cases, the system 102 can maintain logical separation between tenant data. For example, the system 102 can include separate directories for different tenants and apply different permissions and access controls to access the different directories or to process the data, etc.

In certain cases, the tenant data from different tenants is mutually exclusive and/or independent from each other. For example, in certain cases, Tenant A and Tenant B do not share the same data, similar to the way in which data from a local hard drive of Customer A is mutually exclusive and independent of the data (and not considered part) of a local hard drive of Customer B. While Tenant A and Tenant B may have matching or identical data, each tenant would have a separate copy of the data. For example, with reference again to the local hard drive of Customer A and Customer B example, each hard drive could include the same file. However, each instance of the file would be considered part of the separate hard drive and would be independent of the other file. Thus, one copy of the file would be part of Customer's A hard drive and a separate copy of the file would be part of Customer B's hard drive. In a similar manner, to the extent Tenant A has a file that is identical to a file of Tenant B, each tenant would have a distinct and independent copy of the file stored in different locations on a data store or on different data stores.

Further, in certain cases, the system 102 can maintain the mutual exclusivity and/or independence between tenant data even as the tenant data is being processed, stored, and searched by the same underlying hardware. In certain cases, to maintain the mutual exclusivity and/or independence between the data of different tenants, the system 102 can use tenant identifiers to uniquely identify data associated with different tenants.

In a shared computing resource environment, some components of the system 102 can be instantiated and designated for individual tenants and other components can be shared by multiple tenants. In certain embodiments, a separate intake system 110, indexing system 112, and query system 114 can be instantiated for each tenant, whereas the shared storage system 116 or other components (e.g., data store, metadata catalog, and/or acceleration data store, described below) can be shared by multiple tenants. In some such embodiments where components are shared by multiple tenants, the components can maintain separate directories for the different tenants to ensure their mutual exclusivity and/or independence from each other. Similarly, in some such embodiments, the system 102 can use different hosting computing systems or different isolated execution environments to process the data from the different tenants as part of the intake system 110, indexing system 112, and/or query system 114.

In some embodiments, individual components of the intake system 110, indexing system 112, and/or query system 114 may be instantiated for each tenant or shared by multiple tenants. For example, some individual intake system components (e.g., forwarders, output ingestion buffer) may be instantiated and designated for individual tenants, while other intake system components (e.g., a data retrieval subsystem, intake ingestion buffer, and/or streaming data processor), may be shared by multiple tenants.

In certain embodiments, an indexing system 112 (or certain components thereof) can be instantiated and designated for a particular tenant or shared by multiple tenants. In some embodiments where a separate indexing system 112 is instantiated and designated for each tenant, different resources can be reserved for different tenants. For example, Tenant A can be consistently allocated a minimum of four indexing nodes and Tenant B can be consistently allocated a minimum of two indexing nodes. In some such embodiments, the four indexing nodes can be reserved for Tenant A and the two indexing nodes can be reserved for Tenant B, even if Tenant A and Tenant B are not using the reserved indexing nodes.

In embodiments where an indexing system 112 is shared by multiple tenants, components of the indexing system 112 can be dynamically assigned to different tenants. For example, if Tenant A has greater indexing demands, additional indexing nodes can be instantiated or assigned to Tenant A's data. However, as the demand decreases, the indexing nodes can be reassigned to a different tenant, or terminated. Further, in some embodiments, a component of the indexing system 112 can concurrently process data from the different tenants.

In some embodiments, one instance of query system 114 may be shared by multiple tenants. In some such cases, the same search head can be used to process/execute queries for different tenants and/or the same search nodes can be used to execute query for different tenants. Further, in some such cases, different tenants can be allocated different amounts of compute resources. For example, Tenant A may be assigned more search heads or search nodes based on demand or based on a service level arrangement than another tenant. However, once a search is completed the search head and/or nodes assigned to Tenant A may be assigned to Tenant B, deactivated, or their resource may be re-allocated to other components of the system 102, etc.

In some cases, by sharing more components with different tenants, the functioning of the system 102 can be improved. For example, by sharing components across tenants, the system 102 can improve resource utilization thereby reducing the amount of resources allocated as a whole. For example, if four indexing nodes, two search heads, and four search nodes are reserved for each tenant then those compute resources are unavailable for use by other processes or tenants, even if they go unused. In contrast, by sharing the indexing nodes, search heads, and search nodes with different tenants and instantiating additional compute resources, the system 102 can use fewer resources overall while providing improved processing time for the tenants that are using the compute resources. For example, if tenant A is not using any search nodes and tenant B has many searches running, the system 102 can use search nodes that would have been reserved for tenant A to service tenant B. In this way, the system 102 can decrease the number of compute resources used/reserved, while improving the search time for tenant B and improving compute resource utilization.

2.0. Data Ingestion, Indexing, and Storage

Figure 2:
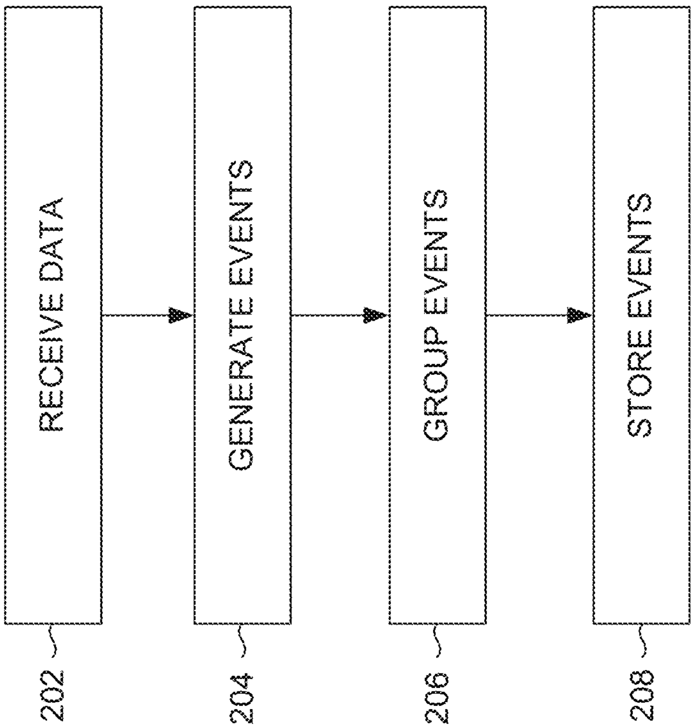
FIG. 2 is a flow diagram illustrating an embodiment of a routine implemented by the data intake and query system to process, index, and store data.

FIG. 2 is a flow diagram illustrating an embodiment of a routine implemented by the system 102 to process, index, and store data received from host devices 104. The data flow illustrated in FIG. 2 is provided for illustrative purposes only. It will be understood that one or more of the steps of the processes illustrated in FIG. 2 may be removed or that the ordering of the steps may be changed. Furthermore, for the purposes of illustrating a clear example, one or more particular system components are described in the context of performing various operations during each of the data flow stages. For example, the intake system 110 is described as receiving machine data and the indexing system 112 is described as generating events, grouping events, and storing events. However, other system arrangements and distributions of the processing steps across system components may be used. For example, in some cases, the intake system 110 may generate events.

At block 202, the intake system 110 receives data from a host device 104. The intake system 110 initially may receive the data as a raw data stream generated by the host device 104. For example, the intake system 110 may receive a data stream from a log file generated by an application server, from a stream of network data from a network device, or from any other source of data. Non-limiting examples of machine data that can be received by the intake system 110 is described herein with reference to FIG. 3A.

In some embodiments, the intake system 110 receives the raw data and may segment the data stream into messages, possibly of a uniform data size, to facilitate subsequent processing steps. The intake system 110 may thereafter process the messages in accordance with one or more rules to conduct preliminary processing of the data. In one embodiment, the processing conducted by the intake system 110 may be used to indicate one or more metadata fields applicable to each message. For example, the intake system 110 may include metadata fields within the messages, or publish the messages to topics indicative of a metadata field. These metadata fields may, for example, provide information related to a message as a whole and may apply to each event that is subsequently derived from the data in the message. For example, the metadata fields may include separate fields specifying each of a host, a source, and a sourcetype related to the message. A host field may contain a value identifying a host name or IP address of a device that generated the data. A source field may contain a value identifying a source of the data, such as a pathname of a file or a protocol and port related to received network data. A sourcetype field may contain a value specifying a particular sourcetype label for the data. Additional metadata fields may also be included, such as a character encoding of the data, if known, and possibly other values that provide information relevant to later processing steps. In certain embodiments, the intake system 110 may perform additional operations, such as, but not limited to, identifying individual events within the data, determining timestamps for the data, further enriching the data, etc.

At block 204, the indexing system 112 generates events from the data. In some cases, as part of generating the events, the indexing system 112 can parse the data of the message. In some embodiments, the indexing system 112 can determine a sourcetype associated with each message (e.g., by extracting a sourcetype label from the metadata fields associated with the message, etc.) and refer to a sourcetype configuration corresponding to the identified sourcetype to parse the data of the message. The sourcetype definition may include one or more properties that indicate to the indexing system 112 to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a sourcetype for the data is unknown to the indexing system 112, the indexing system 112 may infer a sourcetype for the data by examining the structure of the data. Then, the indexing system 112 can apply an inferred sourcetype definition to the data to create the events.

In addition, as part of generating events from the data, the indexing system 112 can determine a timestamp for each event. Similar to the process for parsing machine data, the indexing system 112 may again refer to a sourcetype definition associated with the data to locate one or more properties that indicate instructions for determining a timestamp for each event. The properties may, for example, instruct the indexing system 112 to extract a time value from a portion of data for the event (e.g., using a regex rule), to interpolate time values based on timestamps associated with temporally proximate events, to create a timestamp based on a time the portion of machine data was received or generated, to use the timestamp of a previous event, or use any other rules for determining timestamps, etc.

The indexing system 112 can also associate events with one or more metadata fields. In some embodiments, a timestamp may be included in the metadata fields. These metadata fields may include any number of "default fields" that are associated with all events, and may also include one more custom fields as defined by a user. In certain embodiments, the default metadata fields associated with each event may include a host, source, and sourcetype field including or in addition to a field storing the timestamp.

In certain embodiments, the indexing system 112 can also apply one or more transformations to event data that is to be included in an event. For example, such transformations can include removing a portion of the event data (e.g., a portion used to define event boundaries, extraneous characters from the event, other extraneous text, etc.), masking a portion of event data (e.g., masking a credit card number), removing redundant portions of event data, etc. The transformations applied to event data may, for example, be specified in one or more configuration files and referenced by one or more sourcetype definitions.

At block 206, the indexing system 112 can group events. In some embodiments, the indexing system 112 can group events based on time. For example, events generated within a particular time period or events that have a time stamp within a particular time period can be grouped together to form a bucket. A non-limiting example of a bucket is described herein with reference to FIG. 3B.

In certain embodiments, multiple components of the indexing system, such as an indexing node, can concurrently generate events and buckets. Furthermore, each indexing node that generates and groups events can concurrently generate multiple buckets. For example, multiple processors of an indexing node can concurrently process data, generate events, and generate buckets. Further, multiple indexing nodes can concurrently generate events and buckets. As such, ingested data can be processed in a highly distributed manner.

In some embodiments, as part of grouping events together, the indexing system 112 can generate one or more inverted indexes for a particular group of events. A non-limiting example of an inverted index is described herein with reference to FIG. 3C. In certain embodiments, the inverted indexes can include location information for events of a bucket. For example, the events of a bucket may be compressed into one or more files to reduce their size. The inverted index can include location information indicating the particular file and/or location within a particular file of a particular event.

In certain embodiments, the inverted indexes may include keyword entries or entries for field values or field name-value pairs found in events. In some cases, a field name-value pair can include a pair of words connected by a symbol, such as an equals sign or colon. The entries can also include location information for events that include the keyword, field value, or field value pair. In this way, relevant events can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2." In certain embodiments, the indexing system can populate entries in the inverted index with field name-value pairs by parsing events using one or more regex rules to determine a field value associated with a field defined by the regex rule. For example, the regex rule may indicate how to find a field value for a userID field in certain events. In some cases, the indexing system 112 can use the sourcetype of the event to determine which regex to use for identifying field values.

Figure 3C:
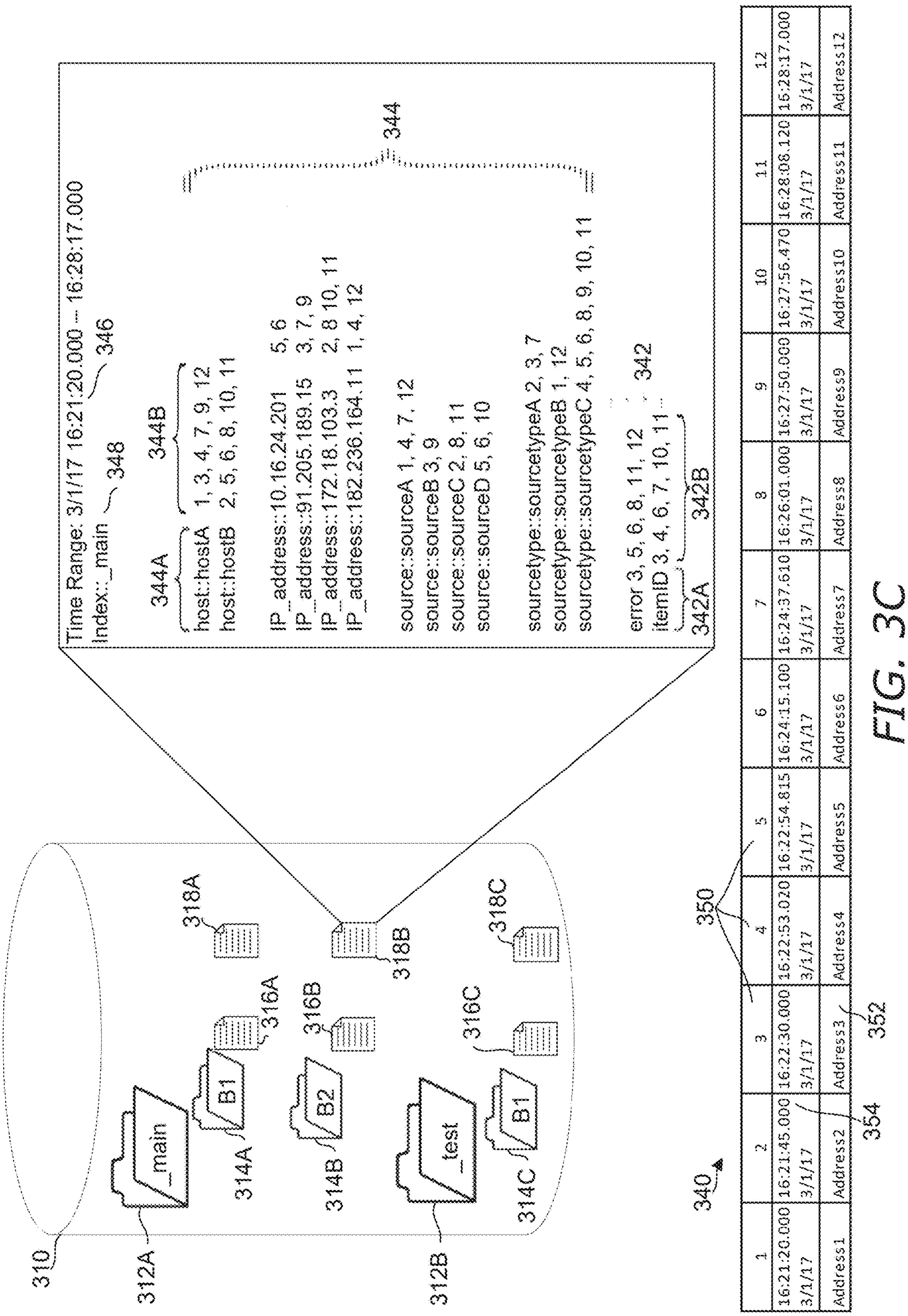

At block 208, the indexing system 112 stores the events with an associated timestamp in the storage system 116, which may be in a local data store and/or in a shared storage system. Timestamps enable a user to search for events based on a time range. In some embodiments, the stored events are organized into "buckets," where each bucket stores events associated with a specific time range based on the time-stamps associated with each event. As mentioned, FIGS. 3B and 3C illustrate an example of a bucket. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

The indexing system 112 may be responsible for storing the events in the storage system 116. As mentioned, the events or buckets can be stored locally on a component of the indexing system 112 or in a shared storage system 116. In certain embodiments, the component that generates the events and/or stores the events (indexing node) can also be assigned to search the events. In some embodiments separate components can be used for generating and storing events (indexing node) and for searching the events (search node).

By storing events in a distributed manner (either by storing the events at different components or in a shared storage system 116), the query system 114 can analyze events for a query in parallel. For example, using map-reduce techniques, multiple components of the query system (e.g., indexing or search nodes) can concurrently search and provide partial responses for a subset of events to another component (e.g., search head) that combines the results to produce an answer for the query. By storing events in buckets for specific time ranges, the indexing system 112 may further optimize the data retrieval process by the query system 114 to search buckets corresponding to time ranges that are relevant to a query. In some embodiments, each bucket may be associated with an identifier, a time range, and a size constraint. In certain embodiments, a bucket can correspond to a file system directory and the machine data, or events, of a bucket can be stored in one or more files of the file system directory. The file system directory can include additional files, such as one or more inverted indexes, high performance indexes, permissions files, configuration files, etc.

In embodiments where components of the indexing system 112 store buckets locally, the components can include a home directory and a cold directory. The home directory can store hot buckets and warm buckets, and the cold directory stores cold buckets. A hot bucket can refer to a bucket that is capable of receiving and storing additional events. A warm bucket can refer to a bucket that can no longer receive events for storage, but has not yet been moved to the cold directory. A cold bucket can refer to a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, components of the indexing system 112 may also have a quarantine bucket that contains events having potentially inaccurate information, such as an incorrect timestamp associated with the event or a timestamp that appears to be an unreasonable timestamp for the corresponding event. The quarantine bucket may have events from any time range; as such, the quarantine bucket may always be searched at search time. Additionally, components of the indexing system may store old, archived data in a frozen bucket that is not capable of being searched at search time. In some embodiments, a frozen bucket may be stored in slower and/or larger memory, such as a hard disk, and may be stored in offline and/or remote storage.

In some embodiments, components of the indexing system 112 may not include a cold directory and/or cold or frozen buckets. For example, in embodiments where buckets are copied to a shared storage system 116 and searched by separate components of the query system 114, buckets can be deleted from components of the indexing system as they are stored to the storage system 116. In certain embodiments, the shared storage system 116 may include a home directory that includes warm buckets copied from the indexing system 112 and a cold directory of cold or frozen buckets as described above.

2.1. Machine Data and Data Storage Examples

FIG. 3A is a block diagram illustrating an embodiment of machine data received by the system 102. The machine data can correspond to data from one or more host devices 104 or data sources. As mentioned, the data source can correspond to a log file, data stream or other data structure that is accessible by a host device 104. In the illustrated embodiment of FIG. 3A, the machine data has different forms. For example, the machine data 302 may be log data that is unstructured or that does not have any clear structure or fields, and include different portions 302A-302E that correspond to different entries of the log and that separated by boundaries. Such data may also be referred to as raw machine data.

The machine data 304 may be referred to as structured or semi-structured machine data as it does include some data in a JSON structure defining certain field and field values (e.g., machine data 304A showing field name: field values container_name:kube-apiserver, host:ip 172 20 43 173.ec2.internal, pod_id:0a73017b-4efa-11e8-a4e1-0a2bf2ab4bba, etc.), but other parts of the machine data 304 is unstructured or raw machine data (e.g., machine data 304B). The machine data 306 may be referred to as structured data as it includes particular rows and columns of data with field names and field values.

In some embodiments, the machine data 302 can correspond to log data generated by a host device 104 configured as an Apache server, the machine data 304 can correspond to log data generated by a host device 104 in a shared computing resource environment, and the machine data 306 can correspond to metrics data. Given the differences between host devices 104 that generated the log data 302, 304, the form of the log data 302, 304 is different. In addition, as the log data 304 is from a host device 104 in a shared computing resource environment, it can include log data generated by an application being executed within an isolated execution environment (304B, excluding the field name "log:") and log data generated by an application that enables the sharing of computing resources between isolated execution environments (all other data in 304). Although shown together in FIG. 3A, it will be understood that machine data with different hosts, sources, or sourcetypes can be received separately and/or found in different data sources and/or host devices 104.

As described herein, the system 102 can process the machine data based on the form in which it is received. In some cases, the intake system 110 can utilize one or more rules to process the data. In certain embodiments, the intake system 110 can enrich the received data. For example, the intake system may add one or more fields to the data received from the host devices 104, such as fields denoting the host, source, sourcetype, index, or tenant associated with the incoming data. In certain embodiments, the intake system 110 can perform additional processing on the incoming data, such as transforming structured data into unstructured data (or vice versa), identifying timestamps associated with the data, removing extraneous data, parsing data, indexing data, separating data, categorizing data, routing data based on criteria relating to the data being routed, and/or performing other data transformations, etc.

In some cases, the data processed by the intake system 110 can be communicated or made available to the indexing system 112, the query system 114, and/or to other systems. In some embodiments, the intake system 110 communicates or makes available streams of data using one or more shards. For example, the indexing system 112 may read or receive data from one shard and another system may receive data from another shard. As another example, multiple systems may receive data from the same shard.

As used herein, a partition can refer to a logical division of data. In some cases, the logical division of data may refer to a portion of a data stream, such as a shard from the intake system 110. In certain cases, the logical division of data can refer to an index or other portion of data stored in the storage system 116, such as different directories or file structures used to store data or buckets. Accordingly, it will be understood that the logical division of data referenced by the term partition will be understood based on the context of its use.

FIGS. 3B and 3C are block diagrams illustrating embodiments of various data structures for storing data processed by the system 102. FIG. 3B includes an expanded view illustrating an example of machine data stored in a data store 310 of the data storage system 116. It will be understood that the depiction of machine data and associated metadata as rows and columns in the table 319 of FIG. 3B is merely illustrative and is not intended to limit the data format in which the machine data and metadata is stored in various embodiments described herein. In one particular embodiment, machine data can be stored in a compressed or encrypted format. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

In the illustrated embodiment of FIG. 3B the data store 310 includes a directory 312 (individually referred to as 312A, 312B) for each index (or partition) that contains a portion of data stored in the data store 310 and a sub-directory 314 (individually referred to as 314A, 314B, 314C) for one or more buckets of the index. In the illustrated embodiment of FIG. 3B, each sub-directory 314 corresponds to a bucket and includes an event data file 316 (individually referred to as 316A, 316B, 316C) and an inverted index 318 (individually referred to as 318A, 318B, 318C). However, it will be understood that each bucket can be associated with fewer or more files and each sub-directory 314 can store fewer or more files.

In the illustrated embodiment, the data store 310 includes a _main directory 312A associated with an index "_main" and a _test directory 312B associated with an index "_test." However, the data store 310 can include fewer or more directories. In some embodiments, multiple indexes can share a single directory or all indexes can share a common directory. Additionally, although illustrated as a single data store 310, it will be understood that the data store 310 can be implemented as multiple data stores storing different portions of the information shown in FIG. 3C. For example, a single index can span multiple directories or multiple data stores.

Furthermore, although not illustrated in FIG. 3B, it will be understood that, in some embodiments, the data store 310 can include directories for each tenant and sub-directories for each index of each tenant, or vice versa. Accordingly, the directories 312A and 312B can, in certain embodiments, correspond to sub-directories of a tenant or include sub-directories for different tenants.

In the illustrated embodiment of FIG. 3B, two sub-directories 314A, 314B of the _main directory 312A and one sub-directory 312C of the _test directory 312B are shown. The sub-directories 314A, 314B, 314C can correspond to buckets of the indexes associated with the directories 312A, 312B. For example, the sub-directories 314A and 314B can correspond to buckets "B1" and "B2," respectively, of the index "_main" and the sub-directory 314C can correspond to bucket "B1" of the index "_test." Accordingly, even though there are two "B1" buckets shown, as each "B1" bucket is associated with a different index (and corresponding directory 312), the system 102 can uniquely identify them.

Although illustrated as buckets "B1" and "B2," it will be understood that the buckets (and/or corresponding sub-directories 314) can be named in a variety of ways. In certain embodiments, the bucket (or sub-directory) names can include information about the bucket. For example, the bucket name can include the name of the index with which the bucket is associated, a time range of the bucket, etc.

As described herein, each bucket can have one or more files associated with it, including, but not limited to one or more raw machine data files, bucket summary files, filter files, inverted indexes (also referred to herein as high performance indexes or keyword indexes), permissions files, configuration files, etc. In the illustrated embodiment of FIG. 3B, the files associated with a particular bucket can be stored in the sub-directory corresponding to the particular bucket. Accordingly, the files stored in the sub-directory 314A can correspond to or be associated with bucket "B1," of index "_main," the files stored in the sub-directory 314B can correspond to or be associated with bucket "B2" of index "_main," and the files stored in the sub-directory 314C can correspond to or be associated with bucket "B1" of index "_test."

FIG. 3B further illustrates an expanded event data file 316C showing an example of data that can be stored therein. In the illustrated embodiment, four events 320, 322, 324, 326 of the machine data file 316C are shown in four rows. Each event 320-326 includes machine data 330 and a timestamp 332. The machine data 330 can correspond to the machine data received by the system 102. For example, in the illustrated embodiment, the machine data 330 of events 320, 322, 324, 326 corresponds to portions 302A, 302B, 302C, 302D, respectively, of the machine data 302 after it was processed by the indexing system 112.

Metadata 334-338 associated with the events 320-326 is also shown in the table 319. In the illustrated embodiment, the metadata 334-338 includes information about a host 334, source 336, and sourcetype 338 associated with the events 320-326. Any of the metadata can be extracted from the corresponding machine data, or supplied or defined by an entity, such as a user or computer system. The metadata fields 334-338 can become part of, stored with, or otherwise associated with the events 320-326. In certain embodiments, the metadata 334-338 can be stored in a separate file of the sub-directory 314C and associated with the machine data file 316C. In some cases, while the timestamp 332 can be extracted from the raw data of each event, the values for the other metadata fields may be determined by the indexing system 112 based on information it receives pertaining to the host device 104 or data source of the data separate from the machine data.

While certain default or user-defined metadata fields can be extracted from the machine data for indexing purposes, the machine data within an event can be maintained in its original condition. As such, in embodiments in which the portion of machine data included in an event is unprocessed or otherwise unaltered, it is referred to herein as a portion of raw machine data. For example, in the illustrated embodiment, the machine data of events 320-326 is identical to the portions of the machine data 302A-302D, respectively, used to generate a particular event. Similarly, the entirety of the machine data 302 may be found across multiple events. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various fields.

In other embodiments, the portion of machine data in an event can be processed or otherwise altered relative to the machine data used to create the event. With reference to the machine data 304, the machine data of a corresponding event (or events) may be modified such that only a portion of the machine data 304 is stored as one or more events. For example, in some cases, only machine data 304B of the machine data 304 may be retained as one or more events or the machine data 304 may be altered to remove duplicate data, confidential information, etc.

In FIG. 3B, the first three rows of the table 319 present events 320, 322, and 324 and are related to a server access log that records requests from multiple clients processed by a server, as indicated by entry of "access.log" in the source column 336. In the example shown in FIG. 3B, each of the events 320-324 is associated with a discrete request made to the server by a client. The raw machine data generated by the server and extracted from a server access log can include the IP address 1140 of the client, the user id 1141 of the person requesting the document, the time 1142 the server finished processing the request, the request line 1143 from the client, the status code 1144 returned by the server to the client, the size of the object 1145 returned to the client (in this case, the gif file requested by the client) and the time spent 1146 to serve the request in microseconds. In the illustrated embodiments of FIGS. 3A, 3B, all the raw machine data retrieved from the server access log is retained and stored as part of the corresponding events 320-324 in the file 316C.

Event 326 is associated with an entry in a server error log, as indicated by "error.log" in the source column 336 that records errors that the server encountered when processing a client request. Similar to the events related to the server access log, all the raw machine data in the error log file pertaining to event 326 can be preserved and stored as part of the event 326.

Saving minimally processed or unprocessed machine data in a data store associated with metadata fields in the manner similar to that shown in FIG. 3B is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

FIG. 3C illustrates an embodiment of another file that can be included in one or more subdirectories 314 or buckets. Specifically, FIG. 3C illustrates an exploded view of an embodiments of an inverted index 318B in the sub-directory 314B, associated with bucket "B2" of the index "_main," as well as an event reference array 340 associated with the inverted index 318B.

In some embodiments, the inverted indexes 318 can correspond to distinct time-series buckets. As such, each inverted index 318 can correspond to a particular range of time for an index. In the illustrated embodiment of FIG. 3C, the inverted indexes 318A, 318B correspond to the buckets "B1" and "B2," respectively, of the index "_main," and the inverted index 318C corresponds to the bucket "B1" of the index "_test." In some embodiments, an inverted index 318 can correspond to multiple time-series buckets (e.g., include information related to multiple buckets) or inverted indexes 318 can correspond to a single time-series bucket.

Each inverted index 318 can include one or more entries, such as keyword (or token) entries 342 or field-value pair entries 344. Furthermore, in certain embodiments, the inverted indexes 318 can include additional information, such as a time range 346 associated with the inverted index or an index identifier 348 identifying the index associated with the inverted index 318. It will be understood that each inverted index 318 can include less or more information than depicted. For example, in some cases, the inverted indexes 318 may omit a time range 346 and/or index identifier 348. In some such embodiments, the index associated with the inverted index 318 can be determined based on the location (e.g., directory 312) of the inverted index 318 and/or the time range of the inverted index 318 can be determined based on the name of the sub-directory 314.

Token entries, such as token entries 342 illustrated in inverted index 318B, can include a token 342A (e.g., "error," "itemID," etc.) and event references 342B indicative of events that include the token. For example, for the token "error," the corresponding token entry includes the token "error" and an event reference, or unique identifier, for each event stored in the corresponding time-series bucket that includes the token "error." In the illustrated embodiment of FIG. 3C, the error token entry includes the identifiers 3, 5, 6, 8, 11, and 12 corresponding to events located in the bucket "B2" of the index "_main."

In some cases, some token entries can be default entries, automatically determined entries, or user specified entries. In some embodiments, the indexing system 112 can identify each word or string in an event as a distinct token and generate a token entry for the identified word or string. In some cases, the indexing system 112 can identify the beginning and ending of tokens based on punctuation, spaces, etc. In certain cases, the indexing system 112 can rely on user input or a configuration file to identify tokens for token entries 342, etc. It will be understood that any combination of token entries can be included as a default, automatically determined, or included based on user-specified criteria.

Similarly, field-value pair entries, such as field-value pair entries 344 shown in inverted index 318B, can include a field-value pair 344A and event references 344B indicative of events that include a field value that corresponds to the field-value pair (or the field-value pair). For example, for a field-value pair sourcetype::sendmail, a field-value pair entry 344 can include the field-value pair "sourcetype::sendmail" and a unique identifier, or event reference, for each event stored in the corresponding time-series bucket that includes a sourcetype "sendmail."

In some cases, the field-value pair entries 344 can be default entries, automatically determined entries, or user specified entries. As a non-limiting example, the field-value pair entries for the fields "host," "source," and "sourcetype" can be included in the inverted indexes 318 as a default. As such, all of the inverted indexes 318 can include field-value pair entries for the fields "host," "source," and "sourcetype." As yet another non-limiting example, the field-value pair entries for the field "IP_address" can be user specified and may only appear in the inverted index 318B or the inverted indexes 318A, 318B of the index "_main" based on user-specified criteria. As another non-limiting example, as the indexing system 112 indexes the events, it can automatically identify field-value pairs and create field-value pair entries 344. For example, based on the indexing system's 212 review of events, it can identify IP_address as a field in each event and add the IP_address field-value pair entries to the inverted index 318B (e.g., based on punctuation, like two keywords separated by an '=' or ':' etc.). It will be understood that any combination of field-value pair entries can be included as a default, automatically determined, or included based on user-specified criteria.

With reference to the event reference array 340, each unique identifier 350, or event reference, can correspond to a unique event located in the time series bucket or machine data file 316B. The same event reference can be located in multiple entries of an inverted index 318. For example if an event has a sourcetype "splunkd," host "www1" and token "warning," then the unique identifier for the event can appear in the field-value pair entries 344 "sourcetype::splunkd" and "host::www1," as well as the token entry "warning." With reference to the illustrated embodiment of FIG. 3C and the event that corresponds to the event reference 3, the event reference 3 is found in the field-value pair entries 344 "host::hostA," "source::sourceB," "sourcetype::sourcetypeA," and "IP_address::91.205.189.15" indicating that the event corresponding to the event references is from hostA, sourceB, of sourcetypeA, and includes "91.205.189.15" in the event data.

For some fields, the unique identifier is located in only one field-value pair entry for a particular field. For example, the inverted index 318 may include four sourcetype field-value pair entries 344 corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 3C, since the event reference 7 appears in the field-value pair entry "sourcetype::sourcetypeA," then it does not appear in the other field-value pair entries for the sourcetype field, including "sourcetype::sourcetypeB," "sourcetype::sourcetypeC," and "sourcetype::sourcetypeD."

The event references 350 can be used to locate the events in the corresponding bucket or machine data file 316. For example, the inverted index 318B can include, or be associated with, an event reference array 340. The event reference array 340 can include an array entry 350 for each event reference in the inverted index 318B. Each array entry 350 can include location information 352 of the event corresponding to the unique identifier (non-limiting example: seek address of the event, physical address, slice ID, etc.), a timestamp 354 associated with the event, or additional information regarding the event associated with the event reference, etc.

For each token entry 342 or field-value pair entry 344, the event reference 342B, 344B, respectively, or unique identifiers can be listed in chronological order or the value of the event reference can be assigned based on chronological data, such as a timestamp associated with the event referenced by the event reference. For example, the event reference 1 in the illustrated embodiment of FIG. 3C can correspond to the first-in-time event for the bucket, and the event reference 12 can correspond to the last-in-time event for the bucket. However, the event references can be listed in any order, such as reverse chronological order, ascending order, descending order, or some other order (e.g., based on time received or added to the machine data file), etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 3C, the entries are sorted first by entry type and then alphabetically.

In some cases, inverted indexes 318 can decrease the search time of a query. For example, for a statistical query, by using the inverted index, the system 102 can avoid the computational overhead of parsing individual events in a machine data file 316. Instead, the system 102 can use the inverted index 318 separate from the raw record data store to generate responses to the received queries. U.S. Pub. No. 2018/0293304, incorporated herein by reference for all purposes, includes a non-limiting example of how the inverted indexes 318 can be used during a data categorization request command. Additional information is disclosed in U.S. Pat. No. 8,589,403, entitled "COMPRESSED JOURNALING IN EVENT TRACKING FILES FOR METADATA RECOVERY AND REPLICATION," issued on 19 Nov. 2013; U.S. Pat. No. 8,412,696, entitled "REAL TIME SEARCHING AND REPORTING," issued on 2 Apr. 2011; U.S. Pat. Nos. 8,589,375 and 8,589,432, both also entitled "REAL TIME SEARCHING AND REPORTING," both issued on 19 Nov. 2013; U.S. Pat. No. 8,682,925, entitled "DISTRIBUTED HIGH PERFORMANCE ANALYTICS STORE," issued on 25 Mar. 2014; U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY," issued on 8 Sep. 2015; and U.S. Pat. No. 9,990,386, entitled "GENERATING AND STORING SUMMARIZATION TABLES FOR SETS OF SEARCHABLE EVENTS," issued on 5 Jun. 2018; each of which is hereby incorporated by reference in its entirety for all purposes, also include additional information regarding the creation and use of different embodiments of inverted indexes, including, but not limited to keyword indexes, high performance indexes and analytics stores, etc.

3.0. Query Processing and Execution

Figure 4A:
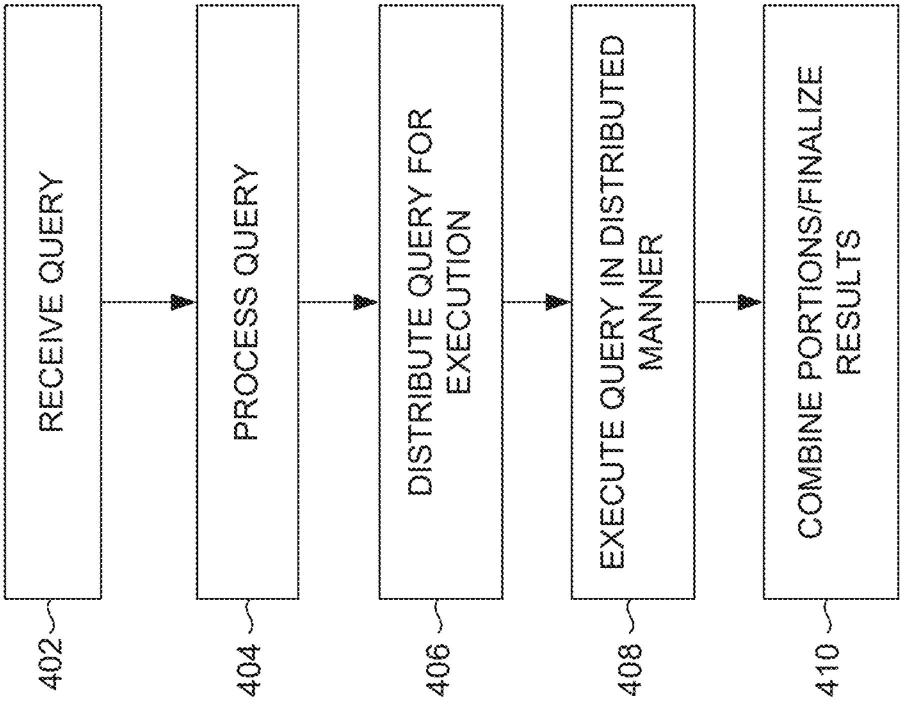
FIG. 4A is a flow diagram illustrating an embodiment of a routine implemented by the query system to execute a query.

FIG. 4A is a flow diagram illustrating an embodiment of a routine implemented by the query system 114 for executing a query. At block 402, the query system 114 receives a search query. As described herein, the query can be in the form of a pipelined command language or other query language and include filter criteria used to identify a set of data and processing criteria used to process the set of data.

At block 404, the query system 114 processes the query. As part of processing the query, the query system 114 can determine whether the query was submitted by an authenticated user and/or review the query to determine that it is in a proper format for the data intake and query system 102, has correct semantics and syntax, etc. In addition, the query system 114 can determine what, if any, configuration files or other configurations to use as part of the query.

In addition as part of processing the query, the query system 114 can determine what portion(s) of the query to execute in a distributed manner (e.g., what to delegate to search nodes) and what portions of the query to execute in a non-distributed manner (e.g., what to execute on the search head). For the parts of the query that are to be executed in a distributed manner, the query system 114 can generate specific commands, for the components that are to execute the query. This may include generating subqueries, partial queries or different phases of the query for execution by different components of the query system 114. In some cases, the query system 114 can use map-reduce techniques to determine how to map the data for the search and then reduce the data. Based on the map-reduce phases, the query system 114 can generate query commands for different components of the query system 114.

As part of processing the query, the query system 114 can determine where to obtain the data. For example, in some cases, the data may reside on one or more indexing nodes or search nodes, as part of the storage system 116 or may reside in a shared storage system or a system external to the system 102. In some cases, the query system 114 can determine what components to use to obtain and process the data. For example, the query system 114 can identify search nodes that are available for the query, etc.

At block 406, the query system 1206 distributes the determined portions or phases of the query to the appropriate components (e.g., search nodes). In some cases, the query system 1206 can use a catalog to determine which components to use to execute the query (e.g., which components include relevant data and/or are available, etc.).

At block 408, the components assigned to execute the query, execute the query. As mentioned, different components may execute different portions of the query. In some cases, multiple components (e.g., multiple search nodes) may execute respective portions of the query concurrently and communicate results of their portion of the query to another component (e.g., search head). As part of the identifying the set of data or applying the filter criteria, the components of the query system 114 can search for events that match the criteria specified in the query. These criteria can include matching keywords or specific values for certain fields. The searching operations at block 408 may use the late-binding schema to extract values for specified fields from events at the time the query is processed. In some embodiments, one or more rules for extracting field values may be specified as part of a sourcetype definition in a configuration file or in the query itself. In certain embodiments where search nodes are used to obtain the set of data, the search nodes can send the relevant events back to the search head, or use the events to determine a partial result, and send the partial result back to the search head.

At block 410, the query system 114 combines the partial results and/or events to produce a final result for the query. As mentioned, in some cases, combining the partial results and/or finalizing the results can include further processing the data according to the query. Such processing may entail joining different set of data, transforming the data, and/or performing one or more mathematical operations on the data, preparing the results for display, etc.

In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the query system 114 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring to the search jobs.

The query system 114 can also perform various operations to make the search more efficient. For example, before the query system 114 begins execution of a query, it can determine a time range for the query and a set of common keywords that all matching events include. The query system 114 may then use these parameters to obtain a superset of the eventual results. Then, during a filtering stage, the query system 114 can perform field-extraction operations on the superset to produce a reduced set of search results. This speeds up queries, which may be particularly helpful for queries that are performed on a periodic basis. In some cases, to make the search more efficient, the query system 114 can use information known about certain data sets that are part of the query to filter other data sets. For example, if an early part of the query includes instructions to obtain data with a particular field, but later commands of the query do not rely on the data with that particular field, the query system 114 can omit the superfluous part of the query from execution.

3.1. Pipelined Search Language

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can include filter criteria used to search or filter for specific data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "|." In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms or filter criteria at the beginning of the pipeline. Such search terms or filter criteria can include any combination of keywords, phrases, times, dates, Boolean expressions, fieldname-field value pairs, etc. that specify which results should be obtained from different locations. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g., calculation of an aggregate value related to the filtered events such as the average response time of servers with response times of less than 1 microsecond). Furthermore, the search command can allow events to be filtered by keyword as well as field criteria. For example, a search command can filter events based on the word "warning" or filter events based on a field value "10.0.1.2" associated with a field "clientip."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns can contain basic information about the data and/or data that has been dynamically extracted at search time.

Figure 4B:
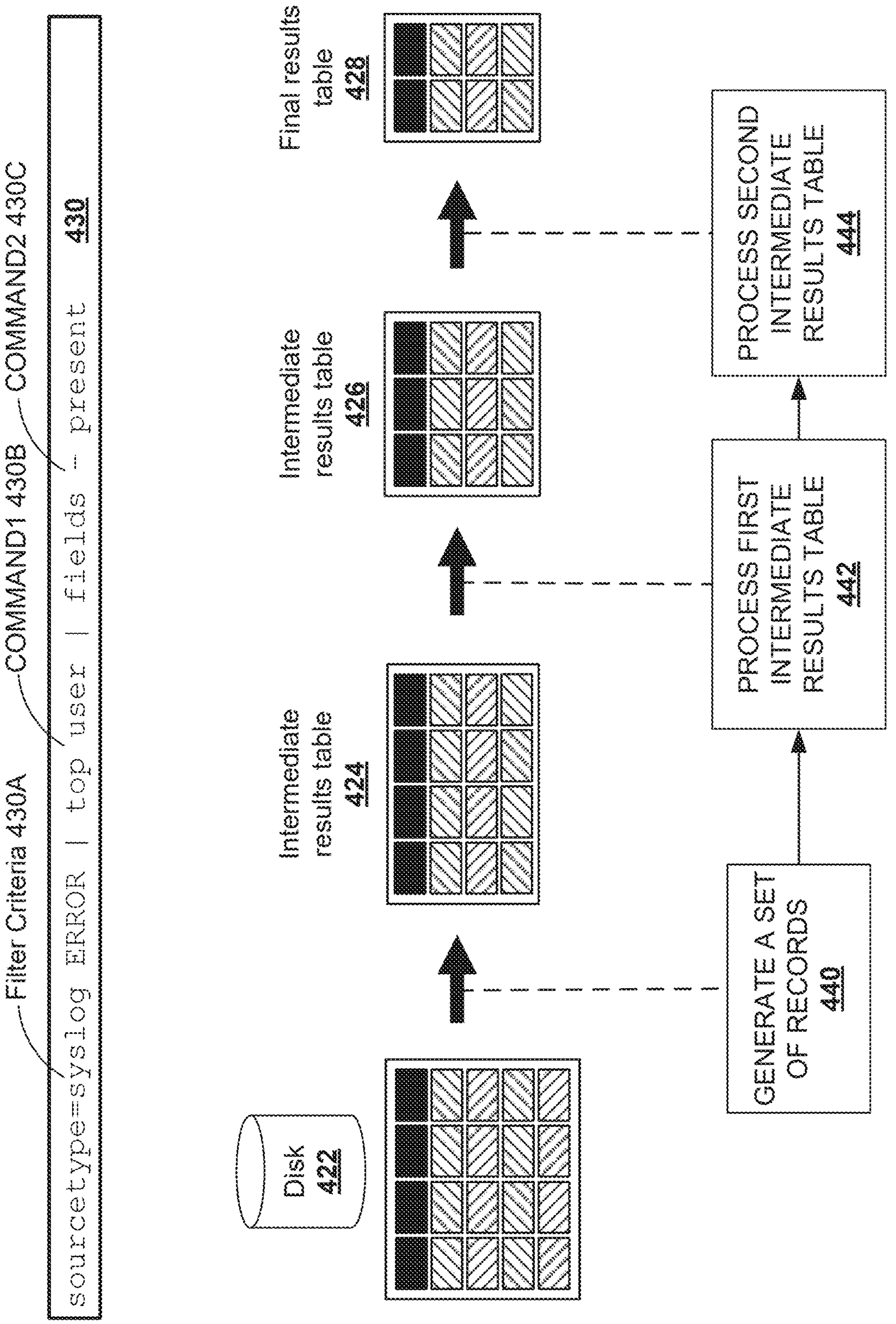
FIG. 4B provides a visual representation of the manner in which a pipelined command language or query can operate.

FIG. 4B provides a visual representation of the manner in which a pipelined command language or query can operate in accordance with the disclosed embodiments. The query 430 can be input by the user and submitted to the query system 114. In the illustrated embodiment, the query 430 comprises filter criteria 430A, followed by two commands 430B, 430C (namely, Command1 and Command2). Disk 422 represents data as it is stored in a data store to be searched. For example, disk 422 can represent a portion of the storage system 116 or some other data store that can be searched by the query system 114. Individual rows of can represent different events and columns can represent different fields for the different events. In some cases, these fields can include raw machine data, host, source, and sourcetype.

At block 440, the query system 114 uses the filter criteria 430A (e.g., "sourcetype=syslog ERROR") to filter events stored on the disk 422 to generate an intermediate results table 424. Given the semantics of the query 430 and order of the commands, the query system 114 can execute the filter criteria 430A portion of the query 430 before executing Command1 or Command2.

Rows in the table 424 may represent individual records, where each record corresponds to an event in the disk 422 that satisfied the filter criteria. Columns in the table 424 may correspond to different fields of an event or record, such as "user," "count," percentage," "timestamp," or the raw machine data of an event, etc. Notably, the fields in the intermediate results table 424 may differ from the fields of the events on the disk 422. In some cases, this may be due to the late binding schema described herein that can be used to extract field values at search time. Thus, some of the fields in table 424 may not have existed in the events on disk 422.

Illustratively, the intermediate results table 424 has fewer rows than what is shown in the disk 422 because only a subset of events retrieved from the disk 422 matched the filter criteria 430A "sourcetype=syslog ERROR." In some embodiments, instead of searching individual events or raw machine data, the set of events in the intermediate results table 424 may be generated by a call to a pre-existing inverted index.

At block 442, the query system 114 processes the events of the first intermediate results table 424 to generate the second intermediate results table 426. With reference to the query 430, the query system 114 processes the events of the first intermediate results table 424 to identify the top users according to Command1. This processing may include determining a field value for the field "user" for each record in the intermediate results table 424, counting the number of unique instances of each "user" field value (e.g., number of users with the name David, John, Julie, etc.) within the intermediate results table 424, ordering the results from largest to smallest based on the count, and then keeping only the top 10 results (e.g., keep an identification of the top 10 most common users). Accordingly, each row of table 426 can represent a record that includes a unique field value for the field "user," and each column can represent a field for that record, such as fields "user," "count," and "percentage."

At block 444, the query system 114 processes the second intermediate results table 426 to generate the final results table 428. With reference to query 430, the query system 114 applies the command "fields-present" to the second intermediate results table 426 to generate the final results table 428. As shown, the command "fields-present" of the query 430 results in one less column, which may represent that a field was removed during processing. For example, the query system 114 may have determined that the field "percentage" was unnecessary for displaying the results based on the Command2. In such a scenario, each record of the final results table 428 would include a field "user," and "count." Further, the records in the table 428 would be ordered from largest count to smallest count based on the query commands.

]It will be understood that the final results table 428 can be a third intermediate results table, which can be pipelined to another stage where further filtering or processing of the data can be performed, e.g., preparing the data for display purposes, filtering the data based on a condition, performing a mathematical calculation with the data, etc. In different embodiments, other query languages, such as the Structured Query Language ("SQL"), can be used to create a query.

3.2. Field Extraction

As described herein, extraction rules can be used to extract field-value pairs or field values from data. An extraction rule can comprise one or more regex rules that specify how to extract values for the field corresponding to the extraction rule. In addition to specifying how to extract field values, the extraction rules may also include instructions for deriving a field value by performing a function on a character string or value retrieved by the extraction rule. For example, an extraction rule may truncate a character string or convert the character string into a different data format. Extraction rules can be used to extract one or more values for a field from events by parsing the portions of machine data in the events and examining the data for one or more patterns of characters, numbers, delimiters, etc., that indicate where the field begins and, optionally, ends. In certain embodiments, extraction rules can be stored in one or more configuration files. In some cases, a query itself can specify one or more extraction rules.

In some cases, extraction rules can be applied at data ingest by the intake system 110 and/or indexing system 112. For example, the intake system 110 and indexing system 112 can apply extraction rules to ingested data and/or events generated from the ingested data and store results in an inverted index.

The system 102 advantageously allows for search time field extraction. In other words, fields can be extracted from the event data at search time using late-binding schema as opposed to at data ingestion time, which was a major limitation of the prior art systems. Accordingly, extraction rules can be applied at search time by the query system 114. The query system can apply extraction rules to events retrieved from the storage system 116 or data received from sources external to the system 102. Extraction rules can be applied to all the events in the storage system 116 or to a subset of the events that have been filtered based on some filter criteria (e.g., event timestamp values, etc.).

Figure 4C:
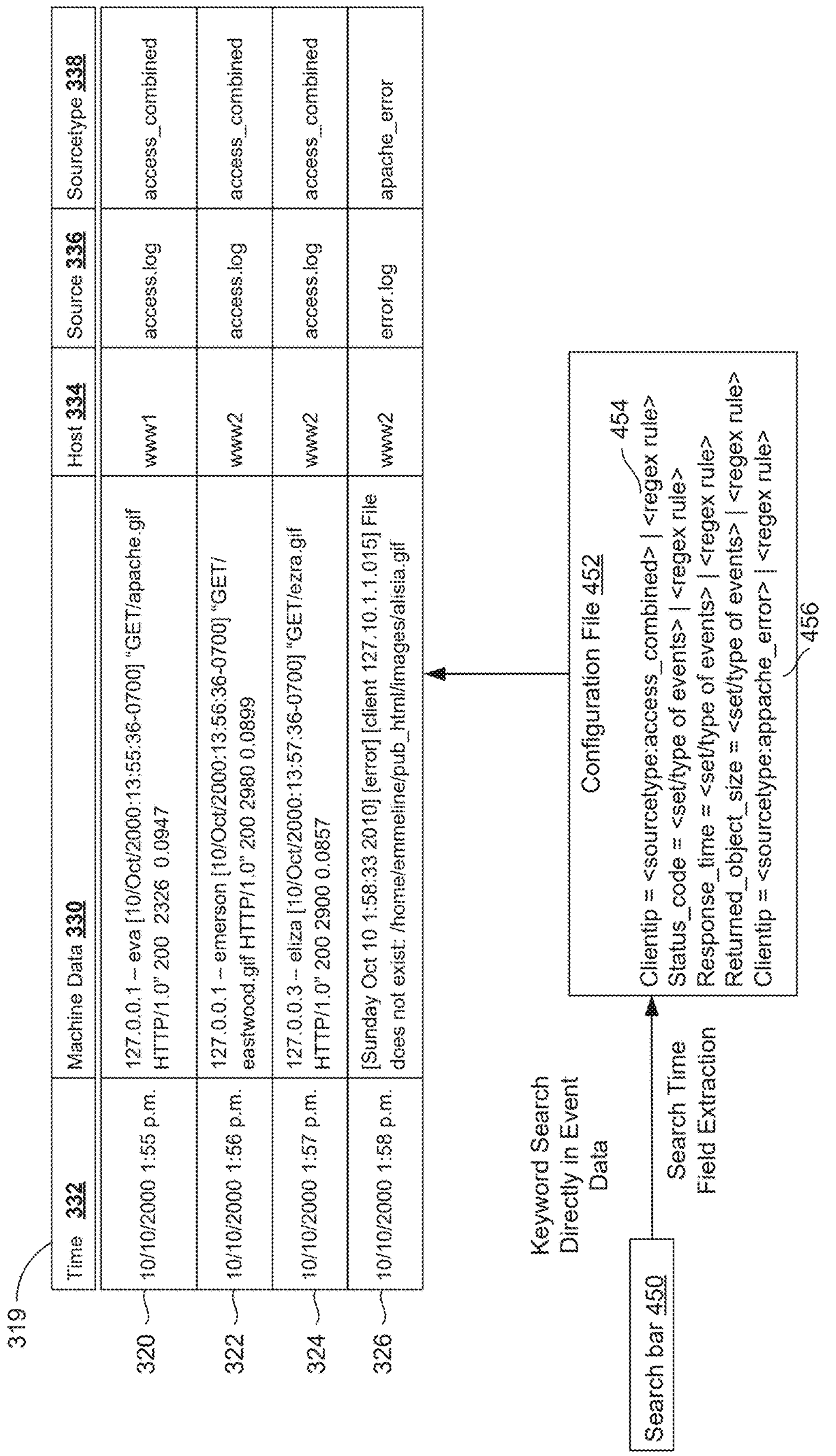
FIG. 4C is a block diagram illustrating an embodiment of a configuration file that includes various extraction rules that can be applied to events.

FIG. 4C is a block diagram illustrating an embodiment of the table 319 showing events 320-326, described previously with reference to FIG. 3B. As described herein, the table 319 is for illustrative purposes, and the events 320-326 may be stored in a variety of formats in an event data file 316 or raw record data store. Further, it will be understood that the event data file 316 or raw record data store can store millions of events. FIG. 4C also illustrates an embodiment of a search bar 450 for entering a query and a configuration file 452 that includes various extraction rules that can be applied to the events 320-326.

As a non-limiting example, if a user inputs a query into search bar 450 that includes only keywords (also known as "tokens"), e.g., the keyword "error" or "warning," the query system 114 can search for those keywords directly in the events 320-326 stored in the raw record data store.

As described herein, the indexing system 112 can optionally generate and use an inverted index with keyword entries to facilitate fast keyword searching for event data. If a user searches for a keyword that is not included in the inverted index, the query system 114 may nevertheless be able to retrieve the events by searching the event data for the keyword in the event data file 316 or raw record data store directly. For example, if a user searches for the keyword "eva," and the name "eva" has not been indexed at search time, the query system 114 can search the events 320-326 directly and return the first event 320. In the case where the keyword has been indexed, the inverted index can include a reference pointer that will allow for a more efficient retrieval of the event data from the data store. If the keyword has not been indexed, the query system 114 can search through the events in the event data file to service the search.

In many cases, a query include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the query, "status=404." This search query finds events with "status" fields that have a value of "404." When the search is run, the query system 114 does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "Nov 15 09:33:22 evaemerson."

FIG. 4C illustrates the manner in which configuration files may be used to configure custom fields at search time in accordance with the disclosed embodiments. In response to receiving a query, the query system 114 determines if the query references a "field." For example, a query may request a list of events where the "clientip" field equals "127.0.0.1." If the query itself does not specify an extraction rule and if the field is not an indexed metadata field, e.g., time, host, source, sourcetype, etc., then in order to determine an extraction rule, the query system 114 may, in one or more embodiments, locate configuration file 452 during the execution of the query.

Configuration file 452 may contain extraction rules for various fields, e.g., the "clientip" field. The extraction rules may be inserted into the configuration file 452 in a variety of ways. In some embodiments, the extraction rules can comprise regular expression rules that are manually entered in by the user.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system can then generate a regular expression that extracts those fields from similar events and store the regular expression as an extraction rule for the associated field in the configuration file 452.

In some embodiments, the indexing system 112 can automatically discover certain custom fields at index time and the regular expressions for those fields will be automatically generated at index time and stored as part of extraction rules in configuration file 452. For example, fields that appear in the event data as "key=value" pairs may be automatically extracted as part of an automatic field discovery process. Note that there may be several other ways of adding field definitions to configuration files in addition to the methods discussed herein.

Events from heterogeneous sources that are stored in the storage system 116 may contain the same fields in different locations due to discrepancies in the format of the data generated by the various sources. For example, event 326 also contains a "clientip" field, however, the "clientip" field is in a different format from events 320, 322, and 324. Furthermore, certain events may not contain a particular field at all. To address the discrepancies in the format and content of the different types of events, the configuration file 452 can specify the set of events to which an extraction rule applies. For example, extraction rule 454 specifies that it is to be used with events having a sourcetype "access_combined," and extraction rule 456 specifies that it is to be used with events having a sourcetype "apache_error." Other extraction rules shown in configuration file 452 specify a set or type of events to which they apply. In addition, the extraction rules shown in configuration file 452 include a regular expression for parsing the identified set of events to determine the corresponding field value. Accordingly, each extraction rule may pertain to only a particular type of event. Accordingly, if a particular field, e.g., "clientip" occurs in multiple types of events, each of those types of events can have its own corresponding extraction rule in the configuration file 452 and each of the extraction rules would comprise a different regular expression to parse out the associated field value. In some cases, the sets of events are grouped by sourcetype because events generated by a particular source can have the same format.

The field extraction rules stored in configuration file 452 can be used to perform search-time field extractions. For example, for a query that requests a list of events with sourcetype "access_combined" where the "clientip" field equals "127.0.0.1," the query system 114 can locate the configuration file 452 to retrieve extraction rule 454 that allows it to extract values associated with the "clientip" field from the events where the sourcetype is "access_combined" (e.g., events 320-324). After the "clientip" field has been extracted from the events 320, 322, 324, the query system 114 can then apply the field criteria by performing a compare operation to filter out events where the "clientip" field does not equal "127.0.0.1." In the example shown in FIG. 4C, the events 320 and 322 would be returned in response to the user query. In this manner, the query system 114 can service queries with filter criteria containing field criteria and/or keyword criteria.

It should also be noted that any events filtered by performing a search-time field extraction using a configuration file 452 can be further processed by directing the results of the filtering step to a processing step using a pipelined search language. Using the prior example, a user can pipeline the results of the compare step to an aggregate function by asking the query system 114 to count the number of events where the "clientip" field equals "127.0.0.1."

By providing the field definitions for the queried fields at search time, the configuration file 452 allows the event data file or raw record data store to be field searchable. In other words, the raw record data store can be searched using keywords as well as fields, wherein the fields are searchable name/value pairings that can distinguish one event from another event and can be defined in configuration file 452 using extraction rules. In comparison to a search containing field names, a keyword search may result in a search of the event data directly without the use of a configuration file.

Further, the ability to add schema to the configuration file 452 at search time results in increased efficiency and flexibility. A user can create new fields at search time and simply add field definitions to the configuration file 452. As a user learns more about the data in the events, the user can continue to refine the late-binding schema by adding new fields, deleting fields, or modifying the field extraction rules in the configuration file for use the next time the schema is used by the system 102. Because the system 102 maintains the underlying raw data and uses late-binding schema for searching the raw data, it enables a user to continue investigating and learn valuable insights about the raw data long after data ingestion time. Similarly, multiple field definitions can be added to the configuration file to capture the same field across events generated by different sources or sourcetypes. This allows the system 102 to search and correlate data across heterogeneous sources flexibly and efficiently.

3.3. Data Models

The system 102 can use one or more data models to search and/or better understand data. A data model is a hierarchically structured search-time mapping of semantic knowledge about one or more datasets. It encodes the domain knowledge used to build a variety of specialized searches of those datasets. Those searches, in turn, can be used to generate reports. Additional information regarding data models, their creation and their use is described in U.S. Pat. Nos. 8,788,525 and 8,788,526, both entitled "DATA MODEL FOR MACHINE DATA FOR SEMANTIC SEARCH," both issued on 22 Jul. 2014; U.S. Pat. No. 8,983,994, entitled "GENERATION OF A DATA MODEL FOR SEARCHING MACHINE DATA," issued on 17 Mar. 2015; U.S. Pat. No. 9,128,980, entitled "GENERATION OF A DATA MODEL APPLIED TO QUERIES," issued on 8 Sep. 2015; U.S. Pat. No. 9,589,012, entitled "GENERATION OF A DATA MODEL APPLIED TO OBJECT QUERIES," issued on 7 Mar. 2017; each of which is hereby incorporated by reference in its entirety for all purposes. Building reports using a report generation interface is further explained in U.S. patent application Ser. No. 14/503,335, entitled "GENERATING REPORTS FROM UNSTRUCTURED DATA," filed on 30 Sep. 2014, and which is hereby incorporated by reference in its entirety for all purposes.

3.4. Acceleration Techniques

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

Performing extraction and analysis operations at search time can involve a large amount of data and require a large number of computational operations, which can cause delays in processing the queries. In some embodiments, the system 102 can employ a number of unique acceleration techniques to speed up analysis operations performed at search time. These techniques include: performing search operations in parallel using multiple components of the query system 114, using an inverted index 118, and accelerating the process of generating reports. Additional acceleration techniques are described in U.S. Pub. No. 2019/0354559, which is incorporated by reference herein for all purposes.

To facilitate faster query processing, a query can be structured such that multiple components of the query system 114 (e.g., search nodes) perform the query in parallel, while aggregation of search results from the multiple components is performed at a particular component (e.g., search head). For example, consider a scenario in which a user enters the query "Search "error" | stats count BY host." The query system 114 can identify two phases for the query, including: (1) subtasks (e.g., data retrieval or simple filtering) that may be performed in parallel by multiple components, such as search nodes, and (2) a search results aggregation operation to be executed by one component, such as the search head, when the results are ultimately collected from the search nodes.

Based on this determination, the query system 114 can generate commands to be executed in parallel by the search nodes, with each search node applying the generated commands to a subset of the data to be searched. In this example, the query system 114 generates and then distributes the following commands to the individual search nodes: "Search "error" | prestats count BY host." In this example, the "prestats" command can indicate that individual search nodes are processing a subset of the data and are responsible for producing partial results and sending them to the search head. After the search nodes return the results to the search head, the search head aggregates the received results to form a single search result set. By executing the query in this manner, the system effectively distributes the computational operations across the search nodes while reducing data transfers. It will be understood that the query system 114 can employ a variety of techniques to use distributed components to execute a query. In some embodiments, the query system 114 can use distributed components for only mapping functions of a query (e.g., gather data, applying filter criteria, etc.). In certain embodiments, the query system 114 can use distributed components for mapping and reducing functions (e.g., joining data, combining data, reducing data, etc.) of a query.

4.0. Example Use Cases

The system 102 provides various schemas, dashboards, and visualizations that simplify developers' tasks to create applications with additional capabilities, including but not limited to security, data center monitoring, IT service monitoring, and client/customer insights.

4.1. Security Features

An embodiment of an enterprise security application is as SPLUNK® ENTERPRISE SECURITY, which performs monitoring and alerting operations and includes analytics to facilitate identifying both known and unknown security threats based on large volumes of data stored by the system 102. The enterprise security application provides the security practitioner with visibility into security-relevant threats found in the enterprise infrastructure by capturing, monitoring, and reporting on data from enterprise security devices, systems, and applications. Through the use of the system 102 searching and reporting capabilities, the enterprise security application provides a top-down and bottom-up view of an organization's security posture.

Additional information related to various security applications is described in U.S. application Ser. No. 16/512,899; U.S. Pat. No. 8,826,434, entitled "SECURITY THREAT DETECTION BASED ON INDICATIONS IN BIG DATA OF ACCESS TO NEWLY REGISTERED DOMAINS," issued on 2 Sep. 2014; U.S. Pat. No. 9,215,240, entitled "INVESTIGATIVE AND DYNAMIC DETECTION OF POTENTIAL SECURITY-THREAT INDICATORS FROM EVENTS IN BIG DATA," issued on 15 Dec. 2015; U.S. Pat. No. 9,173,801, entitled "GRAPHIC DISPLAY OF SECURITY THREATS BASED ON INDICATIONS OF ACCESS TO NEWLY REGISTERED DOMAINS," issued on 3 Nov. 2015; U.S. Pat. No. 9,248,068, entitled "SECURITY THREAT DETECTION OF NEWLY REGISTERED DOMAINS," issued on 2 Feb. 2016; U.S. Pat. No. 9,426,172, entitled "SECURITY THREAT DETECTION USING DOMAIN NAME ACCESSES," issued on 23 Aug. 2016; U.S. Pat. No. 9,432,396, entitled "SECURITY THREAT DETECTION USING DOMAIN NAME REGISTRATIONS," issued on 30 Aug. 2016; and U.S. App. Pub. No. 2013/0318236, entitled "KEY INDICATORS VIEW," filed on 31 Jul. 2013; each of which is hereby incorporated by reference in its entirety for all purposes.

4.3. IT Service Monitoring

An embodiment of an IT monitoring application is SPLUNK® IT SERVICE INTELLIGENCE™, which performs monitoring and alerting operations. The IT monitoring application also includes analytics to help an analyst diagnose the root cause of performance problems based on large volumes of data stored by the system 102 as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, an IT monitoring application system is configured to store large volumes of minimally-processed service-related data at ingestion time for later retrieval and analysis at search time (sometimes referred to as "data ingestion volumes"), to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

Additional disclosure regarding IT Service Monitoring is described in U.S. application Ser. No. 16/512,899, incorporated by reference herein in its entirety.

4.4. Client or Customer Insights

As described herein, the system 102 can receive heterogeneous data from disparate systems. In some cases, the data from the disparate systems may be related and correlating the data can result in insights into client or customer interactions with various systems of a vendor. To aid in the correlation of data across different systems, multiple field definitions can be added to one or more configuration files to capture the same field or data across events generated by different sources or sourcetypes. This can enable the system 102 to search and correlate data across heterogeneous sources flexibly and efficiently.

Figure 4D:
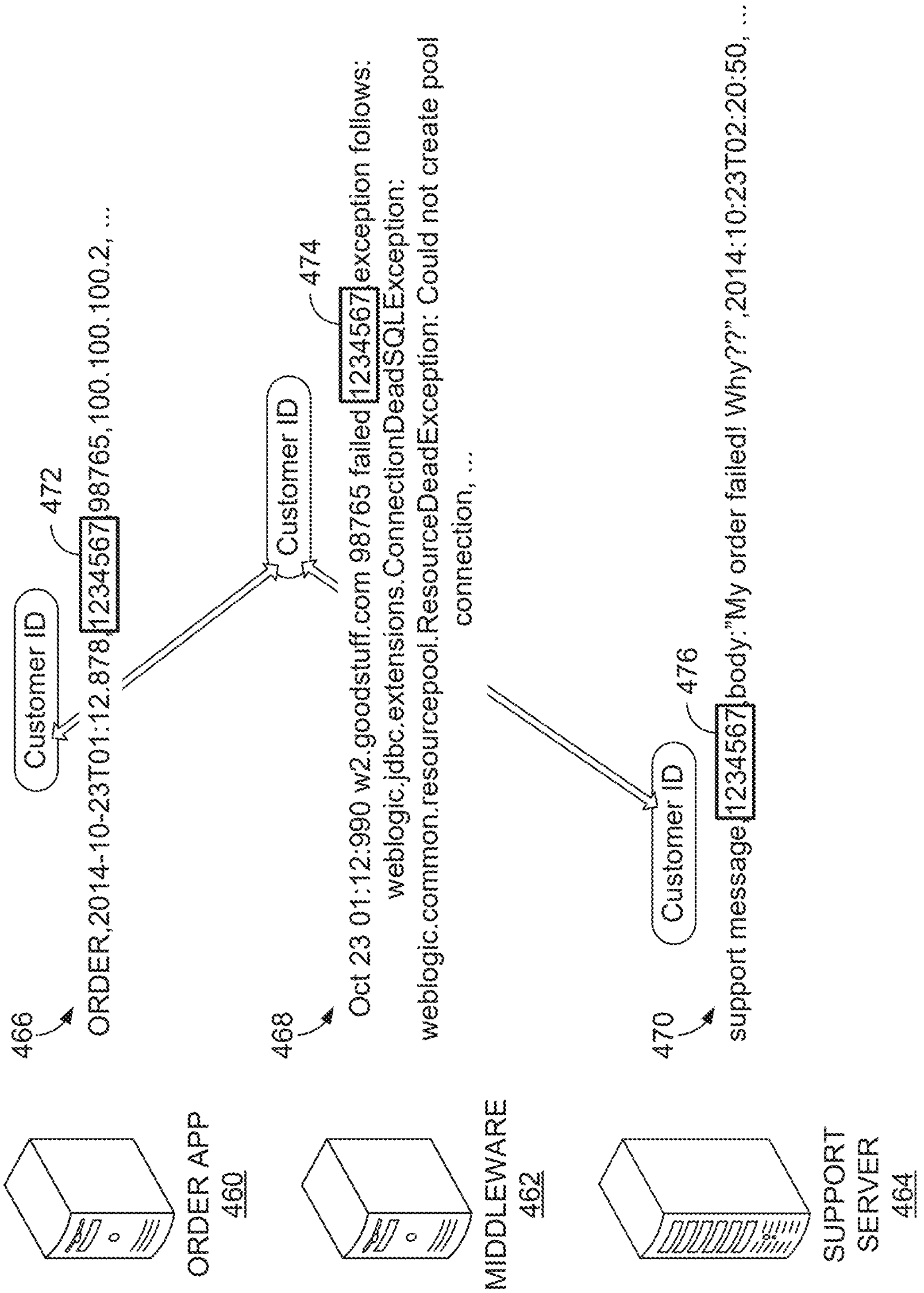
FIG. 4D is a block diagram illustrating an example scenario where a common customer identifier is found among log data received from disparate data sources.

As a non-limiting example and with reference to FIG. 4D, consider a scenario in which a common customer identifier is found among log data received from three disparate data sources. In this example, a user submits an order for merchandise using a vendor's shopping application program 460 running on the user's system. In this example, the order was not delivered to the vendor's server due to a resource exception at the destination server that is detected by the middleware code 462. The user then sends a message to the customer support server 464 to complain about the order failing to complete. The three systems 460, 462, 464 are disparate systems that do not have a common logging format. The shopping application program 460 sends log data 466 to the system 102 in one format, the middleware code 462 sends error log data 468 in a second format, and the support server 464 sends log data 470 in a third format.

Using the log data received at the system 102 from the three systems 460, 462, 464, the vendor can uniquely obtain an insight into user activity, user experience, and system behavior. The system 102 allows the vendor's administrator to search the log data from the three systems 460, 462, 464, thereby obtaining correlated information, such as the order number and corresponding customer ID number of the person placing the order. The system 102 also allows the administrator to see a visualization of related events via a user interface. The administrator can query the system 102 for customer ID field value matches across the log data from the three systems 460, 462, 464 that are stored in the storage system 116. While the customer ID field value exists in the data gathered from the three systems 460, 462, 464, it may be located in different areas of the data given differences in the architecture of the systems. The query system 114 obtains events from the storage system 116 related to the three systems 460, 462, 464. The query system 114 then applies extraction rules to the events in order to extract field values for the field "customer ID" that it can correlate. As described herein, the query system 114 may apply a different extraction rule to each set of events from each system when the event format differs among systems. In this example, a user interface can display to the administrator the events corresponding to the common customer ID field values 472, 474, and 476, thereby providing the administrator with insight into a customer's experience. The system 102 can provide additional user interfaces and reports to aid a user in analyzing the data associated with the customer.

5.0. Architecture Specific Description

As discussed above, a data processing environment may include and execute logic configured to obtain (receive or retrieve) alerts and perform prioritization operations thereby generating a prioritized listing of the alerts, which may be provided to a user via a user interface. Such prioritization operations may be triggered by queries and/or automatically initiated by a data ingestion analytic subsystem within the data processing environment (described below) and following the generation of one or more alerts in response to the queries or other processing. In embodiments discussed herein, the data ingestion analytic subsystem includes an alert prioritization subsystem that is configured to receive or retrieve generated alerts, evaluate the alerts via a trained machine learning model thereby producing a score for each alert, and generate a prioritized (or ranked) listing of the alerts based on each alert's machine learning generated score.

An alert may be defined as a collection of fields each containing certain data having a specific data type and corresponding to processing of received data (such as raw data discussed above). For example, an alert may be generated as a result of processing received raw by the data intake and query system 102 (e.g., by streaming data processors 546 discussed below) where a result of the processing is then evaluated against one or more rules (or thresholds) or evaluated by a machine learning model with the results being evaluated against one or more rules (or thresholds). The results of the evaluation then may trigger generation of an alert, which is provided to a user, e.g., via a user interface (e.g., web portal) or via data transmission (e.g., text message, email, etc.). The results of such evaluation may indicate existence of an incident, which may refer to a real-world occurrence that typically warrants notification being provided to a user (e.g., a network administrator, a security analyst, etc.). Examples of incidents include, but are not limited or restricted to, server failures, drifting of data from expected values, computer application failures, malware attacks, etc. The alert generation process described above may be performed by the data intake and query system 102 (e.g., by the alert generation component 549 discussed below). Additionally, as used herein, an issue refers to a group of one or more alerts. In some embodiments, the alerts of an issue will all have the same fields. In most embodiments, the alerts comprising an issue are associated with a single incident; however, in certain instances, such need not be the case.

The alerts may be received or retrieved when the data ingestion analytic subsystem is operating in either of a batch mode or a streaming mode. When alerts are obtained in batch mode, a plurality of alerts are obtained such that each of the plurality of alerts is evaluated using a machine learning model. The score generated by the machine learning model is then used to rank the plurality of alerts into a prioritized listing. A user interface, e.g., a graphical user interface (GUI), may then be generated for viewing of the prioritized listing by a user. When alerts are obtained in streaming mode, the data ingestion analytic subsystem may maintain a running prioritized listing (e.g., continuous over a given period of time) such that as alerts are obtained, evaluated using a machine learning model thereby generating a score, and inserted into the running prioritized listing based on the alert's machine learning generated score. A user interface may be updated from time to time (e.g., at predetermined intervals) or upon a triggering event (e.g., insertion of new alert) in order to provide an up-to-date user interface.

Additionally, the alert prioritization subsystem may be configured to prioritize groupings of alerts (referred to herein as "issues") in a similar manner as the prioritization of individual alerts. Further, the alert prioritization subsystem is configured to receive user feedback and tune the trained machine learning model in accordance with the user feedback.

Figure 5A:
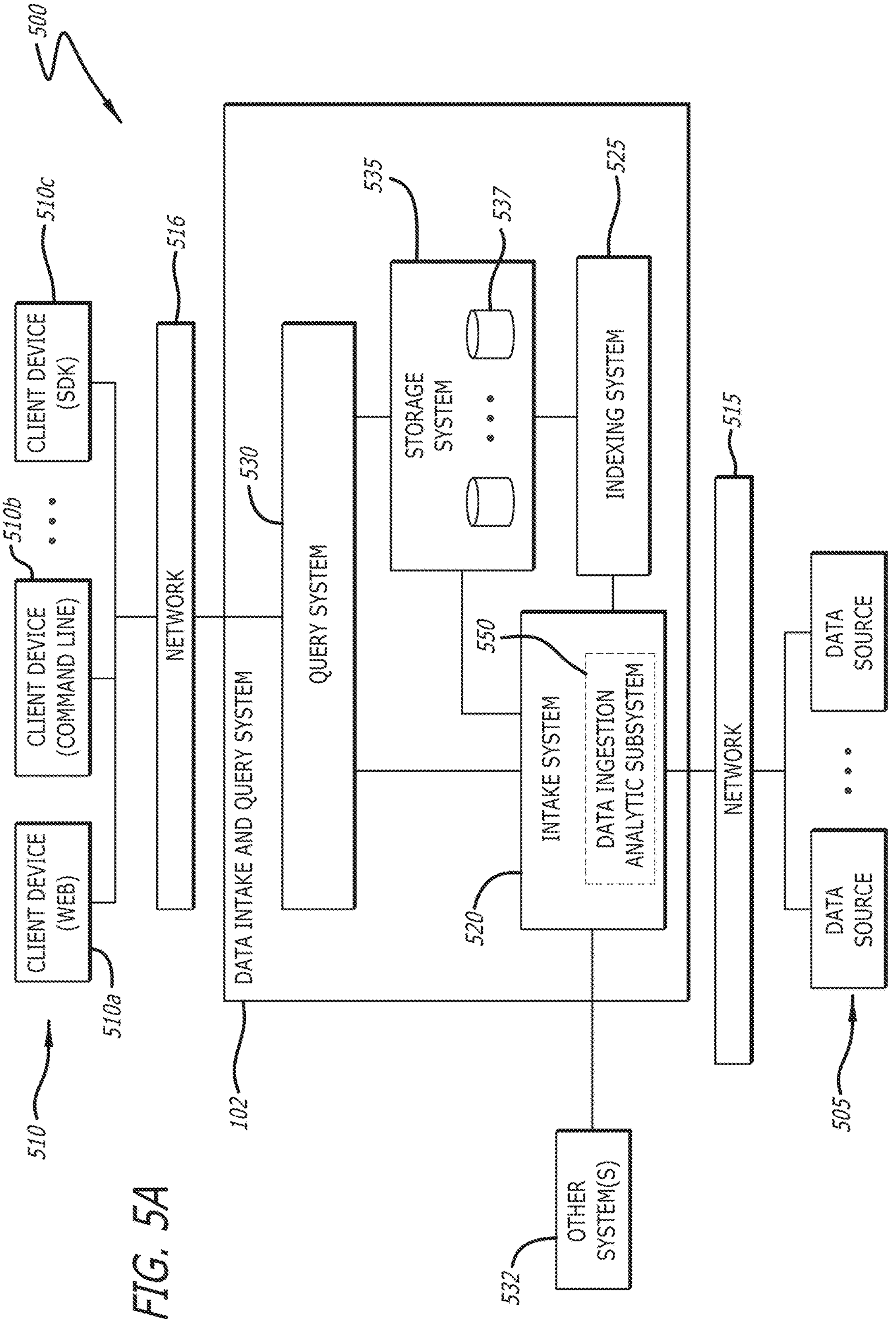
FIG. 5A is a block diagram illustrating an embodiment of a data processing environment including a data ingestion analytic system.

Referring now to FIG. 5A, a block diagram illustrating an embodiment of a data processing environment 500 including a data ingestion analytic system 550 is shown. The data processing environment 500 features one or more data sources 505 (generically referred to as "data source(s)") and client devices 510*a*, 510*b*, 510*c* (generically referred to as "client device(s) 510") in communication with the data intake and query system 102 via networks 515 and 516, respectively. The networks 515, 516 may correspond to portions of the same network or may correspond to different networks. Further, the networks 515, 516 may be implemented as private and/or public networks, one or more LANs, WANs, cellular networks, intranetworks, and/or internetworks using any of wired, wireless, terrestrial microwave, satellite links, etc., and may include the internet.

Each data source 505 broadly represents a distinct source of data that can be consumed by the data intake and query system 102. The data source(s) 505 may be positioned within the same geographic area or within different geographic areas such as different regions of a public cloud network. Examples of a data source 505 may include, without limitation or restriction, data files, directories of files, data sent over a network, event logs, registries, streaming data services, etc.

The client device(s) 510 can be implemented using one or more computing devices in communication with the data intake and query system 102, and represent some of the different ways in which computing devices can submit queries to the data intake and query system 102. For example, a first client device 510*a* may be configured to communicate with the data intake and query system 102 over the network 516 via an Internet (Web) portal. In contrast, a second client device 510*b* may be configured to communicate with the data intake and query system 102 via a command line interface while a third client device 510*c* may be configured to communicate with the data intake and query system 102 via a software developer kit (SDK). As illustrated, the client device(s) 510 can communicate with and submit queries to the data intake and query system 102 in accordance with a plurality of different communication schemes.

The data intake and query system 102 can process and store data received from the data source(s) 505 and execute queries on the data in response to requests received from the client device(s) 510. In the illustrated embodiment, the data intake and query system 102 includes an intake system 520, an indexing system 525, a query system 530, and/or storage system 535 including one or more data stores 537. The data intake and query system 102 may include systems, subsystems, and components, other than the systems 520/525/530/535 described herein. Some of these other systems, subsystems and components are described in U.S. Patent Publication No. 2021/0117857, the entire contents of which are incorporated by reference herein.

As mentioned, the data intake and query system 102 can receive or subsequently store (ingest) data from different sources 505. In some cases, the data sources 505 can be associated with different tenants or customers. Further, each tenant may be associated with one or more indexes, hosts, sources, sourcetypes, or users. The data intake and query system 102 can concurrently receive and process the data from multiple tenants, namely systems and sources owned or controlled by these tenants. In certain cases, although the data from different tenants can be processed together or concurrently, the data intake and query system 102 can take steps to avoid combining or co-mingling data from the different tenants. For example, the data intake and query system 102 can assign a tenant identifier for each tenant and maintain separation between ingested data using the tenant identifier. In some cases, the tenant identifier can be assigned to the data at the data sources 505, or can be assigned to the data by the data intake and query system 102 at time of ingestion.

The intake system 520 may be configured to (i) receive data from the data sources 505 or from the data stores 537, (ii) perform one or more preliminary processing operations on the data, and/or (iii) communicate the data to the indexing system 525, query system 530, or to other systems 532 (which may include, for example, data processing systems, telemetry systems, real-time analytics systems, data stores, databases, etc., any of which may be operated by an operator of the data intake and query system 102 or a third party).

In particular, the intake system 520 may be configured to receive data corresponding to raw machine data, structured or unstructured data, correlation data, data files, directories of files, data sent over a network, event logs, registries, messages published to streaming data sources, performance metrics, sensor data, image and/or video data, previously generated alerts, etc. The intake system 520 can process the data 522, 523 based on the form in which it is received. In some cases, the intake system 520 can utilize one or more rules to process the data 522, 523 and to make the processed data available to downstream systems (e.g., the indexing system 525, query system 530, etc.).

Illustratively, the intake system 520 can enrich the received data 522, 523. For example, the intake system 520 may add one or more fields to the data 522, 523, such as fields denoting the host, source, sourcetype, index, or tenant associated with the incoming data. In certain embodiments, the intake system 520 can perform additional processing on the data 522, 523, such as transforming structured data into unstructured data (or vice versa), identifying timestamps associated with the data, removing extraneous data, parsing data, indexing data, separating data, categorizing data, routing data based on criteria relating to the data being routed, and/or performing other data transformations, etc. As described herein, the intake system 520 can perform analyses and/or queries, generate alerts in accordance with the analysis or query results and prioritize the alerts to determine a prioritized listing, such that users are provided with the prioritized listing and where the users provide feedback thereto where the metrics of the intake system 520 are tuned based on the user feedback.

Figure 5B:
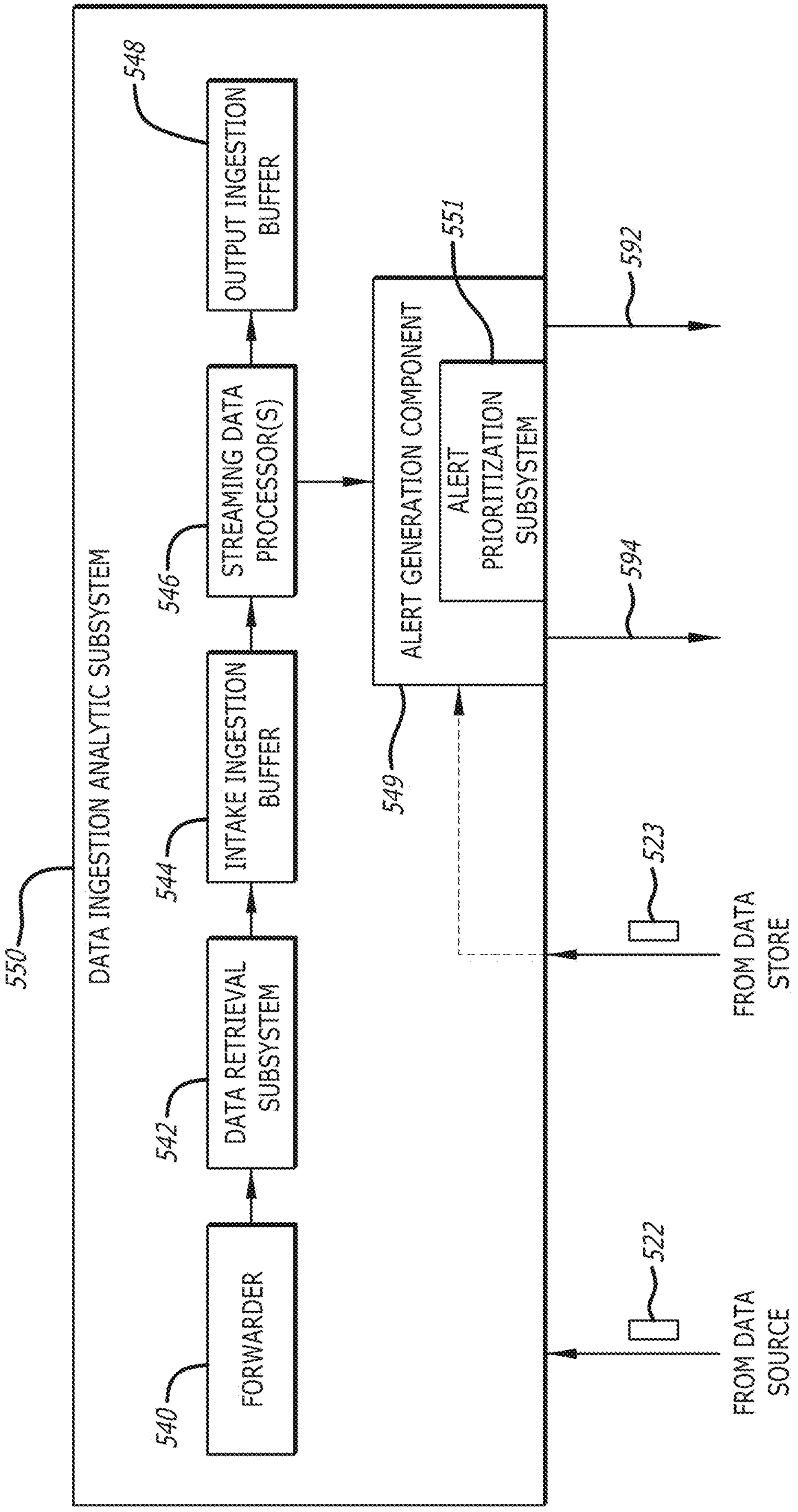
FIG. 5B is a block diagram illustrating an embodiment of the operational flow of information between subsystems within the intake system of the data intake and query system of FIG. 1, including the data ingestion analytic subsystem of FIG. 5A.

Referring now to FIG. 5B, a block diagram illustrating an embodiment of the operational flow of information between subsystems within the intake system of the data intake and query system of FIG. 1 including the data ingestion analytic subsystem of FIG. 5A is shown. As noted above, the intake system 520 may be configured to receive data, which may be data 522 from the data source(s) 505 and/or data 523 from the data stores 537. The intake system 520 features one or more streaming data processors 546 for processing, where the streaming data processor(s) 546 can be configured with one or more data transformation rules to transform incoming messages, and republish the messages to one or both of an intake ingestion buffer 544 and an output ingestion buffer 548. In particular, the intake system 520 can function to conduct preliminary processing of data ingested at the data intake and query system 102. As such, the intake system 520 illustratively includes a forwarder 540 that obtains data from one of the data source(s) 505 and transmits the data to a data retrieval subsystem 542. The data retrieval subsystem 542 may be configured to convert or otherwise format data provided by the forwarder 540 into an appropriate format for inclusion at an intake ingestion buffer 544 and transmit the message to the intake ingestion buffer 544 for processing. Thereafter, the streaming data processor(s) 546 may obtain data from the intake ingestion buffer 544, process the data according to one or more rules, and republish the data to either the intake ingestion buffer 544 (e.g., for additional processing) or to the output ingestion buffer 548, such that the data is made available to downstream components or subsystems such as the indexing system 525, query system 530 or other systems 532. In this manner, the intake system 520 may repeatedly or iteratively process data according to any of a variety of rules, such that the data is formatted for use on the data intake and query system 102 or any other system. As discussed below, the intake system 520 may be configured to conduct such processing rapidly (e.g., in "real-time" with little or no perceptible delay), while ensuring resiliency of the data.

In addition to processing data received from the streaming data processors 546, the alert generation component 549 may also obtain data from data stores, e.g., any of the data stores 537 as shown in FIGS. 5A-5B as well as an alert storage 580 (FIG. 5C), where such data may comprise either processed data from which alerts may be generated as well as previously generated alerts. In either instance, or a combination, such alerts may be prioritized in a "batch" mode whereby each of a plurality of alerts are evaluated by a machine learning model resulting in a score assigned to each alert and a ranking of the alerts based on their corresponding score.

The intake system 520 also features an alert generation component 549 that is configured to receive results of processing received raw data by the streaming data processors 546 and evaluate the results against one or more rules or thresholds, or evaluate the results via a machine learning model and subsequently evaluate the model results against one or more rules or thresholds. The results of such evaluations may trigger the generation of an alert by the alert generation component 549, which may include population of certain fields with metadata of the received data, a portion of the received data itself, and/or results of the processing and/or evaluations discussed above. In some embodiments, these fields may be expressed as temporal, numerical, and/or categorical fields. Additionally, the alert generation component 549 may include an alert prioritization subsystem 551, which is illustrated in FIG. 5C, that is configured to operate in any of a plurality of modes, each discussed below.

Figure 5C:
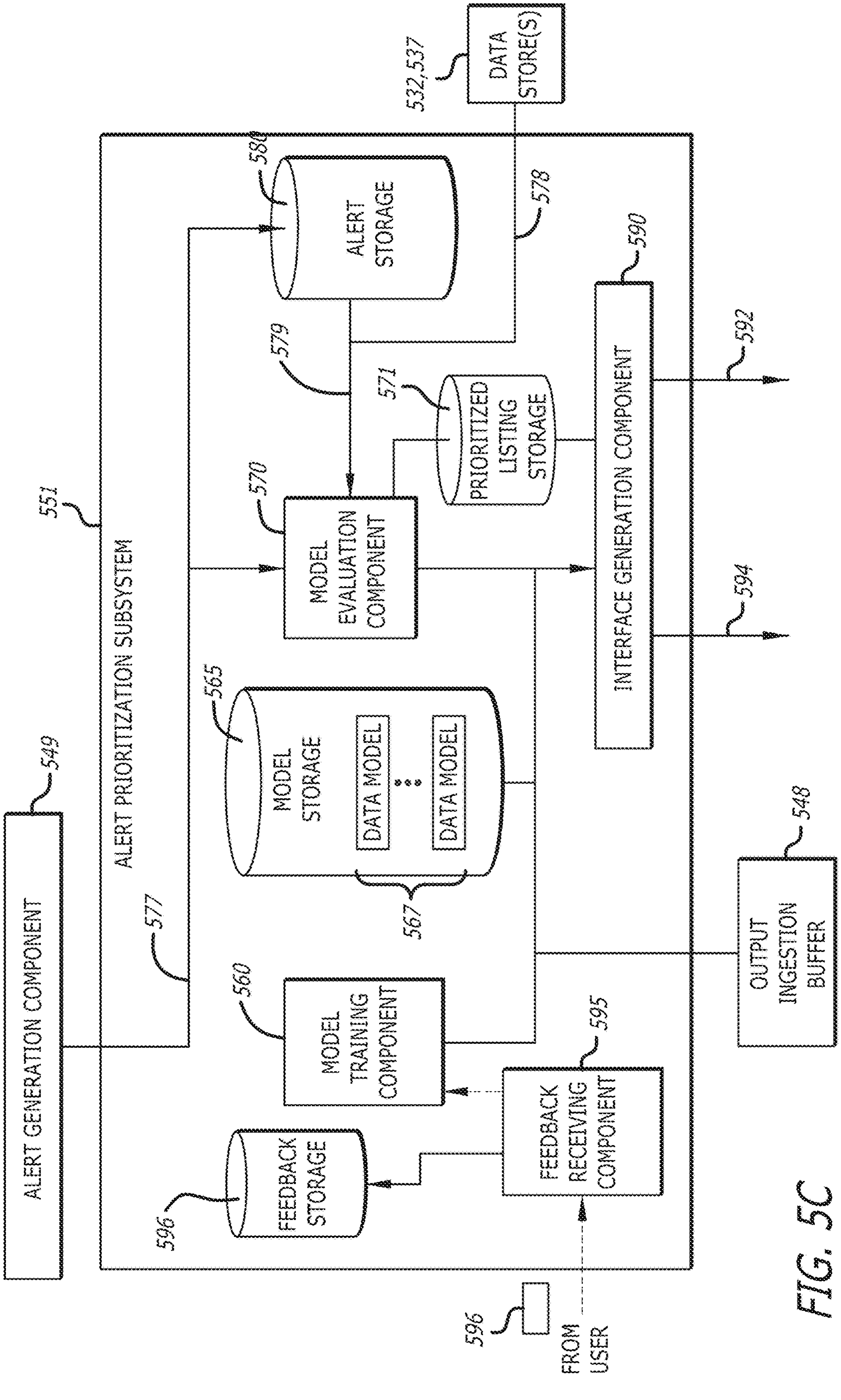
FIG. 5C is a block diagram illustrating an embodiment of the components forming the alert prioritization subsystem deployed within the intake system of FIG. 5B.

Referring now to FIG. 5C, a block diagram illustrating an embodiment of components forming the alert prioritization subsystem 551 deployed within the intake system 520 of FIG. 5B is shown. The alert prioritization subsystem 551 features or utilizes data models, such as data models inclusive of ML models trained to generate a score for each alert based on certain features of the alert, where examples of categorical features include, but are not limited or restricted to, source type, entity type, entity identifier, alert name (title), alert description, geographical location (e.g., of source), etc. Additionally, numerical features may include any field of an alert that includes numerical data as its content. Timestamp data may be encompassed within the numerical features (and also referred to as a temporal field). In some embodiments, the features may be generated via one-hot encoding.

As described above, the alert prioritization subsystem 551 may be configured to operate in any of three different modes of operation: (1) a training mode, (2) a model evaluation mode (which further includes the batch evaluation mode or the streaming evaluation mode), or (3) a retraining mode. The alert prioritization subsystem 551 includes a model training component 560, model storage 565, a model evaluation component 570, an alert and issue storage 580, an interface generation component 590, a feedback receiving component 595, a feedback storage 596, and a prioritized listing storage 571.

While operating in the training mode, the alert prioritization subsystem 551 operates to train data models through ingestion of alert pairs that include a labeling of which alert is a higher priority. As shown in FIG. 5C, a model training component 560 receives the training data (a plurality of alert pairs, with each pair including a label indicating which of the alerts is a higher priority). In some embodiments, the machine learning model is a feedforward neural network model configured to learn to rank item pairs (e.g., alert pairs). An illustrative training process includes providing a multi-layer neural network with an alert pair from the training data including the corresponding label. Forward propagation is performed for both alerts comprising the alert pair and an output value is produced for each alert. The difference between the output values for each alert is determined and provided to a sigmoid node. In training, the provided labeling may be indicated by the ordering of the alerts provided to the neural network, e.g., {higher priority alert, lower priority alert}, where the cross entropy loss between the sigmoid and the provided labeling is back-propagated into the neural network for learning (computing a model gradient and making a weight update using a stochastic optimization algorithm). The process of determining a sigmoid for an alert pair is repeated until each alert pair comprising the training data has been evaluated. Examples of such neural networks may include, but are not limited or restricted to, RankNet, LambdaRank, and LambdaMART.

In some embodiments, the training mode may also include a preview functionality, such that, before deploying a model, a user can supply a collection of historical alerts where the historical alerts are evaluated using the model, which enables the user to see how the model would have prioritized them ("a preview prioritization"). The user can also provision feedback to this preview prioritization in order to further help configure the model before deployment, where provision of feedback and tuning a model is discussed in detail below.

Operating in either model evaluation mode (batch evaluation or streaming evaluation), the data ingestion analytic subsystem 550 operates to evaluate a feature vector of an alert and provide a score for the alert, where the score a prediction of the priority of the alert. While operating in the batch evaluation mode, the alert prioritization subsystem 551 may deploy a machine learning model to evaluate a batch of alerts (e.g., a plurality of alerts that may have been obtained at one period in time) resulting in a score being generated for each alert and generate a prioritized listing of the batch of alerts based on each alert's score. While operating in the streaming mode, the alert prioritization subsystem 551 may deploy a machine learning model to evaluate alerts as each is received in a streaming fashion (e.g., sequentially in time but in an arbitrary order where a number of alerts to be evaluated is unknown) resulting in a score being generated for each alert, generation of a prioritized listing of alerts based on each alert's score such that the prioritized listing of alerts is updated to include each newly received alert. The prioritized listing may be stored in a prioritized listing storage 571.

For example, when the alert prioritization subsystem 551 is operating in either model evaluation mode, the model evaluation component 570 is configured to evaluate an alert 577, 578, 579 using a data model 567, which results in score for the alert indicating a prediction of a priority of the alert. Evaluation of a data model 567 to provide such a prediction may also include evaluation of alerts and/or issues retrieved from the alert and issue storage 580 (where metric data for the stored alerts/issues may be retrieved and evaluated as opposed to the alerts or issues themselves).

In retraining mode, the same methodology as discussed above with respect to the training mode is followed. However, in retraining mode, the labeled training data provided to the machine learning algorithm has been generated from received user feedback.

Further, as user feedback is received either as explicit feedback or implicit feedback, such is utilized to adjust weights used by the model (where adjusting the weights equates to retraining the model). Explicit feedback refers to an explicit approval or disapproval of an alert's prioritization (ranking) or an indication as to where in a prioritized listing an alert is preferred. Implicit feedback refers to feedback automatically determined by the system based on collected telemetry data such as an amount of time a user views a first alert in comparison to the amount of time a second alert is viewed, the order in which alerts are viewed, whether an action is taken for an alert while an action is not taken for another alert (and what specific action(s) are taken), the number of times an alert (or issue) is viewed (e.g., within a given time frame from alert arrival such as 24 hours), etc.

According to embodiments of the disclosure, one or more data models 567 are stored in the model storage 565 operating as local storage or cloud-based storage, where these data models 567 are periodically or aperiodically trained (e.g., retrained) by the model training component 560 when the alert prioritization subsystem 551 is operating in training mode or retraining mode, with each being discussed above.

When operating in batch evaluation mode and following the generation of scores for a batch of alerts, the interface generation component 590 generates an interface 592, such as a graphical user interface (GUI), which illustrates a prioritized listing of at least a portion of the batch of alerts based on the score assigned to each alert. The GUI may also include a normalized prioritized score assigned to each alert. For instance, a score generated by the machine learning model is not constrained in any way (e.g. it may be negative, greater than 100, etc.). The scores may be normalized to lie between predefined boundaries, e.g., 0-10, 0-50, 0-100, etc.

In some instances, the batch of alerts may comprise tens, hundreds, thousands, etc., alerts. Thus, in some examples, a subset of the batch of alerts may be initially illustrated on the GUI (e.g., five, 10, fifteen, etc.), where the GUI may include a user interface (UI) element that is selectable or activatable with selection or activation causing additional (or alternative) alerts to be displayed in the prioritized listing. However, in other embodiments, all alerts may be provided in the prioritized listing.

When operating in streaming evaluation mode and following the generation of score for an alert, the interface generation component 590 may generate an updated GUI including insertion of the alert into the displayed prioritized listing in accordance with the score assigned to the alert (e.g., in a ranked position based on a comparison of the score assigned to the alert and the scores assigned to other alerts). In some instances, the GUI may illustrate a prioritized listing of a set number of alerts (e.g., five, 10, fifteen, etc.) having the highest priorities, such that the addition of the new alert (assuming a ranking higher than at least one displayed alert) results in removal of one alert (that having the lowest priority of those previously displayed) from the GUI.

The new or updated interface may be provided to a user thereby causing rendering of the interface on a screen of a network device. Additionally, immediate notifications 594 may be provided a user in response to generation of particular alert types (e.g., "severe" alerts such as notification of malware, server failure, etc.), where an immediate notification 594 may refer to a pop-up GUI, an email or other transmission of text data to a network device.

6.0. Alert Prioritization Description

Figure 6:
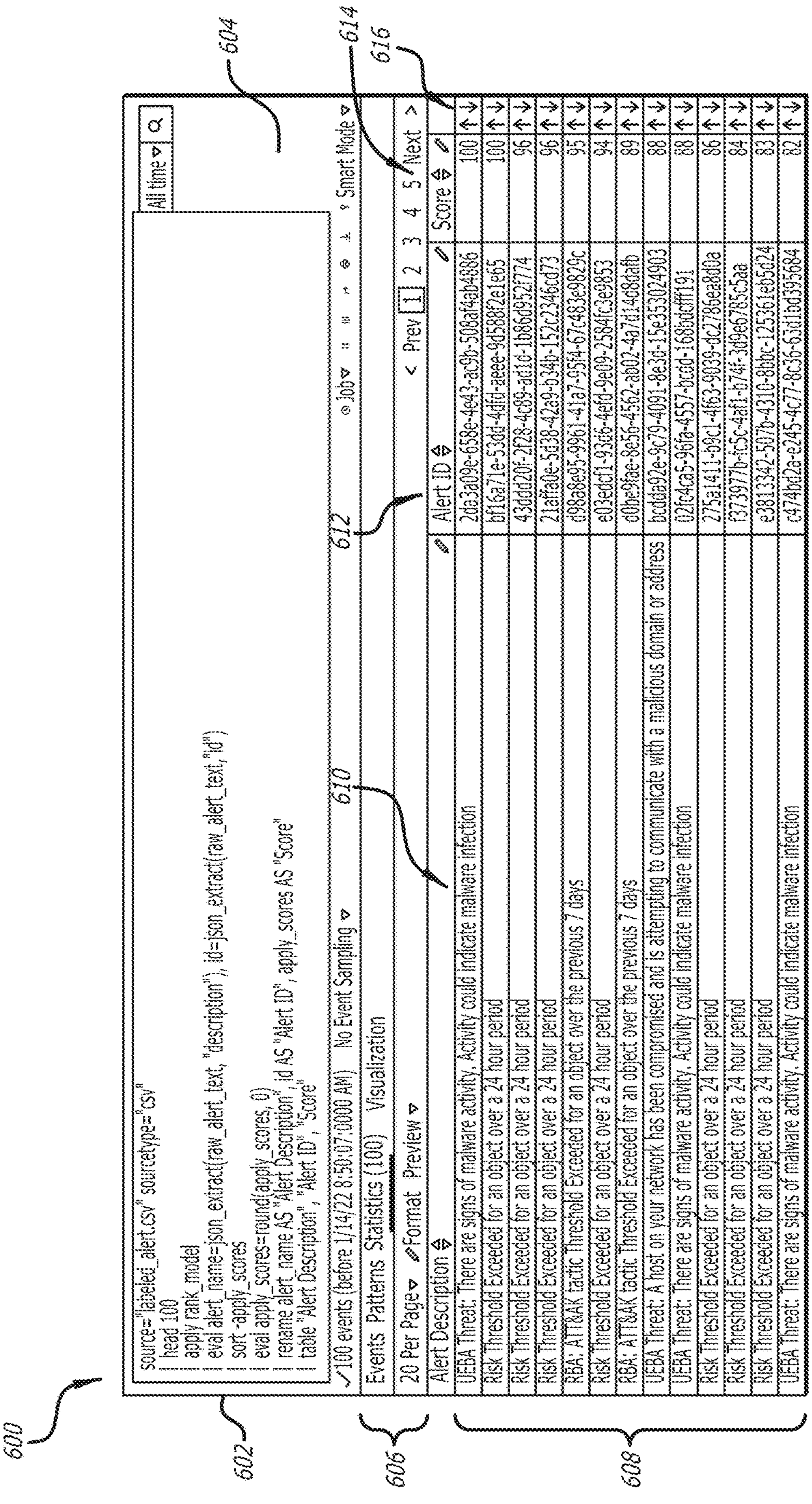
FIG. 6 is one embodiment of a user interface providing an illustrative representation of an alert prioritization listing as determined by the alert prioritization subsystem of FIG. 5C.

Referring now to FIG. 6, one embodiment of a user interface providing an illustrative representation of an alert prioritization listing as determined by the alert prioritization subsystem of FIG. 5C is shown. The user interface, e.g., a graphical user interface (GUI), 600 is shown as one example of an interface that may include the prioritized listing, where the GUI 600 may be rendered on a display screen of a network device. As shown, the GUI 600 includes a query 602 that resulted in the generation of the alerts 608 (which individually may be referenced as $608_1$-$608_x$). The GUI 600 further illustrates optional features such as actionable items (e.g., print, download) provided as user interface (UI) elements 604 as well as UI elements 606 that, upon activation, may cause an alteration in the display presented by the GUI 600 (e.g., a change in number of alerts displayed may occur upon activation).

Alerts 608 are shown in a prioritized listing, i.e., based on a score 614 of each alert, where the display of each alert includes an alert description 610, an alert identifier (ID) 612, a score 614, and feedback UI elements 616 (e.g., arrows indicating approval or disapproval, up and down arrows respectively).

As noted above, an alert may be defined as a collection of fields each containing certain data having a specific data type and corresponding to processing of received data (such as raw data discussed above). Additionally, the term "issue" refers to a group of one or more alerts. In some embodiments, the alerts of an issue will all have the same fields. In most embodiments, the alerts comprising an issue are associated with a single incident; however, in certain instances, such need not be the case.

The ensuing description will discuss a training methodology for a machine learning model that trains and configures the machine learning model to evaluate an alert and provide a score for the alert, where the score indicates a predicted priority of the alert. Further, the description discusses deployment of the trained machine learning model in two modes: a batch mode and a streaming mode. An interface, such as the GUI 600, may be generated as a result of deploying the trained machine learning model in either mode. Also discussed below is a methodology for receiving feedback and retraining the machine learning model based on the feedback. Finally, a methodology for prioritizing issues (a grouping of one or more alerts) is discussed as well. The methodologies and operations discussed below may be performed by logic comprising the data ingestion analytic subsystem 550, and more particularly, the alert prioritization subsystem 551, upon execution by one or more processors.

6.1. Training Methodology

Figure 7:
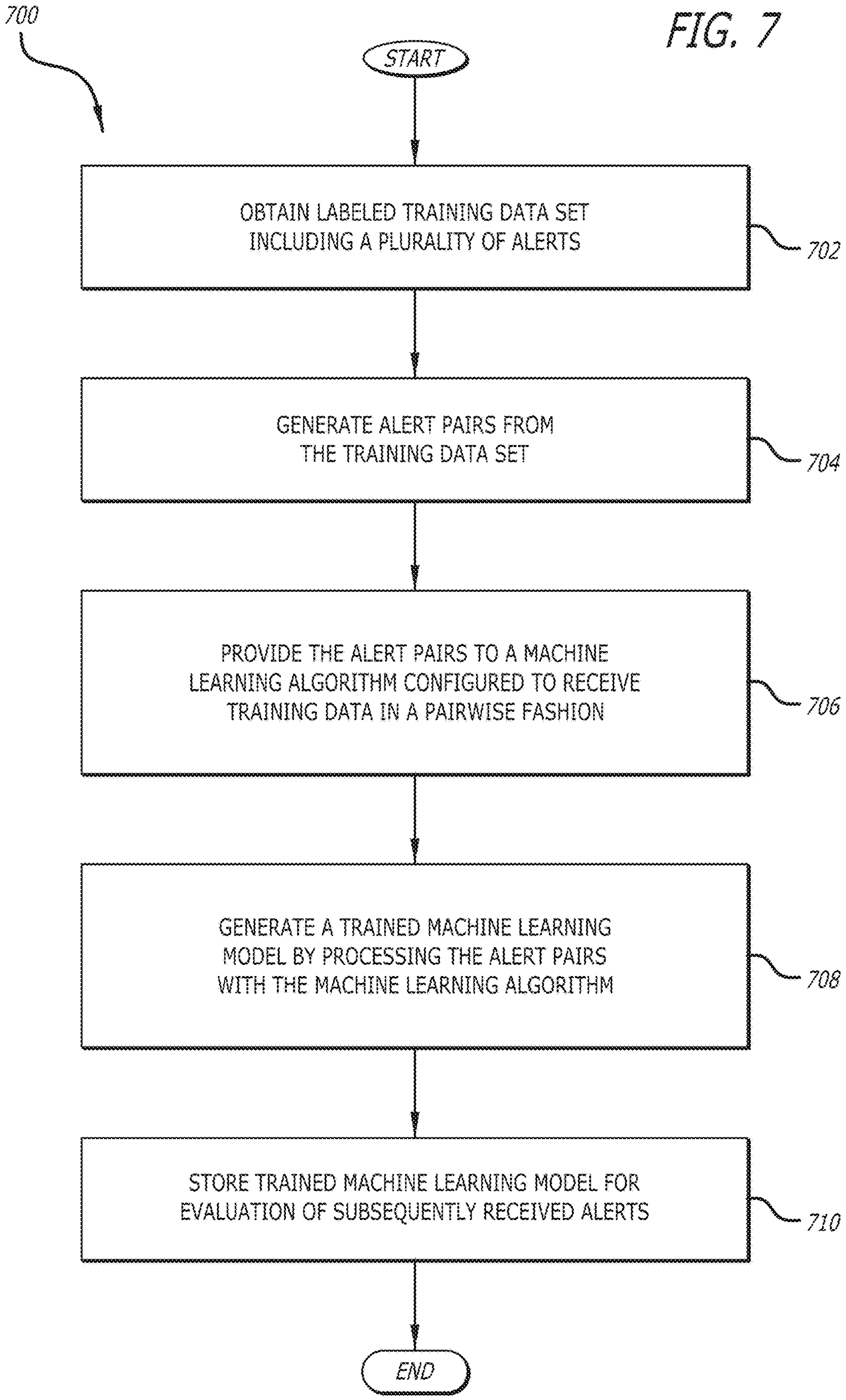
FIG. 7 is a flow diagram illustrating performance of a first embodiment of a machine learning model training methodology as performed by the alert prioritization subsystem.

FIG. 7 depicts a flow diagram illustrating performance of a first embodiment of a machine learning model training methodology as performed by the alert prioritization subsystem. Each block illustrated in FIG. 7 represents an operation of the method 700. It should be understood that not every operation illustrated in FIG. 7 is required. In fact, certain operations may be optional to complete aspects of the method 700. The method 700 begins with an operation of obtaining a labeled training data set including a plurality of alerts (block 702). In some embodiments, alert pairs are generated from the labeled training data set (block 704). An alert pair is comprised of two alerts with an indication as to which of the two alerts has a higher priority score. For instance, such labeling may be indicated by the ordering of the alerts in an alert pair, e.g., {higher priority alert, lower priority alert} (or vice versa). In some instances, the labeled training data set may include at least a subset of all possible ordered pairings, e.g., {higher priority alert, lower priority alert}. In other embodiments, the labeled training data set may be obtained as a set of ordered pairs in a particular order (e.g., such that block 704 is not required for the method 700).

The method 700 continues with providing the labeled training data to a machine learning algorithm that is configured to receive ordered pairs, e.g., to receive labeled training data in a pairwise fashion (block 706). It should be understood that reference to providing an alert to a machine learning algorithm or a trained machine learning model may refer to providing a feature vector representing the alert. Thus, the operations of providing the alert pairs to the machine learning algorithm for training may include operations of generating a feature vector for each alert by parsing each alert to extract certain data (features) and/or parse the metadata of each alert for certain features. A trained machine learning model is then generated by processing the labeled alert pairs with the machine learning algorithm, which may be stored for deployment to evaluate subsequently received alerts (blocks 708, 710).

6.2.1 Alert Prioritization Methodology in Batch Mode

Figure 8A:
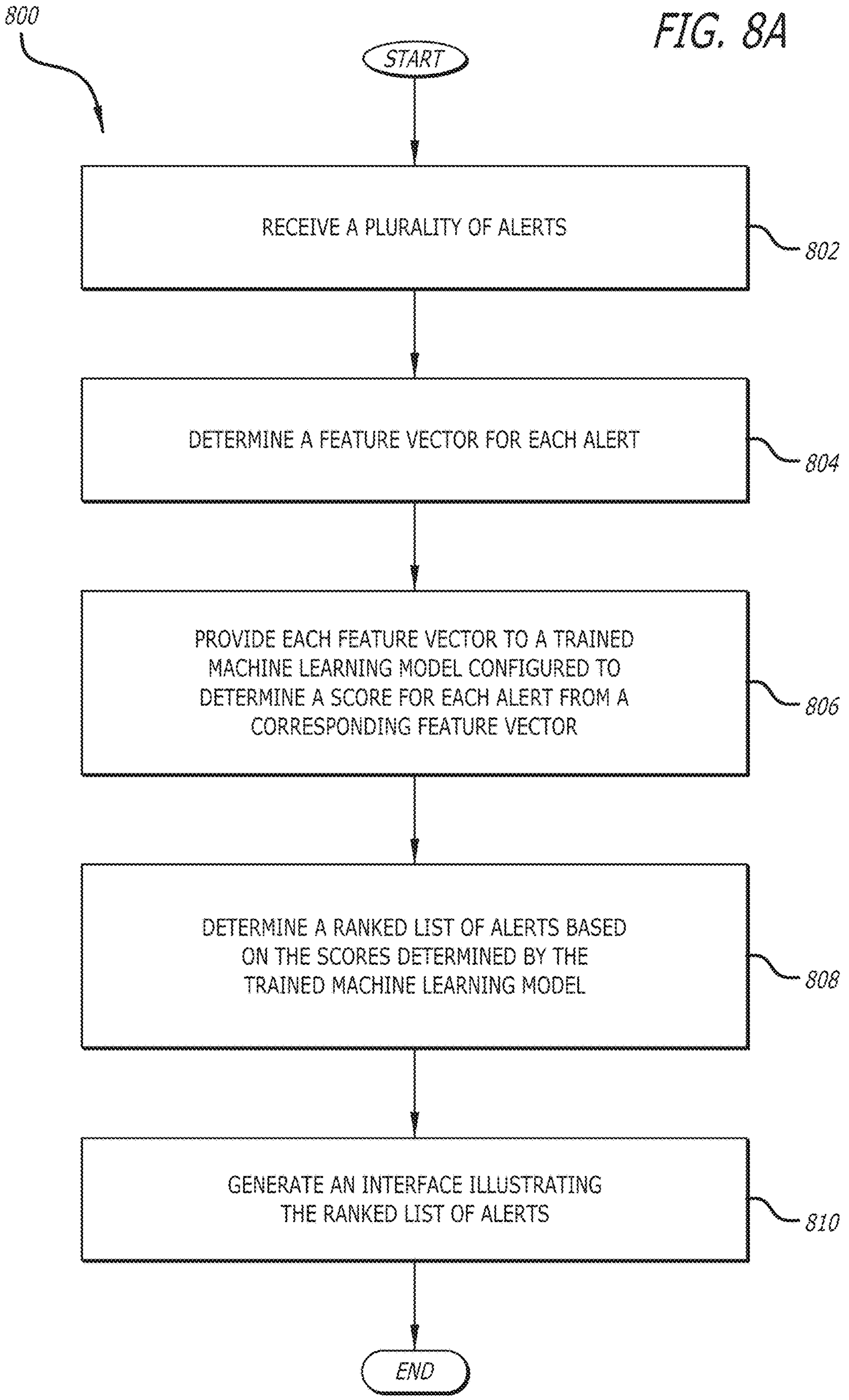
FIG. 8A is a flow diagram illustrating performance of a first embodiment of the deployment of the alert prioritization subsystem in a batch mode.

Referring to FIG. 8A, a flow diagram illustrating performance of a first embodiment of the deployment of the alert prioritization subsystem in a batch mode is shown. Each block illustrated in FIG. 8A represents an operation of the method 800. It should be understood that not every operation illustrated in FIG. 8A is required. In fact, certain operations may be optional to complete aspects of the method 800. The method 800 begins with an operation of obtaining a plurality of alerts, e.g., a batch of alerts (block 802). As should be understood, the term "batch" refers to a plurality. The alerts may be obtained in either a push (received) or pull (queried for) manner. Once the batch of alerts have been obtained, the method 800 continues with the generation of a feature vector for each alert (block 804). The generation of a feature vector includes parsing of an alert to extract certain information from the alert and populating features of the feature vector with the extracted information. Additionally, metadata of the alert may be obtained and populated into one or more features. The feature vectors may be stored in the alert storage 580 for later evaluation.

The feature vectors are then provided to a trained machine learning model that is configured to determine a score for each alert based on evaluation of the alert's feature vector (block 806). From the score assigned to each alert, a prioritized listing of the alerts is generated and a user interface (UI) illustrating such is subsequently generated (blocks 808, 810). The prioritized listing represents a ranked list. As mentioned above, one example of a UI that may be generated to illustrate the prioritized listing is the GUI 600 of FIG. 6.

6.2.2 Alert Prioritization Methodology in Streaming Mode

Figure 8B:
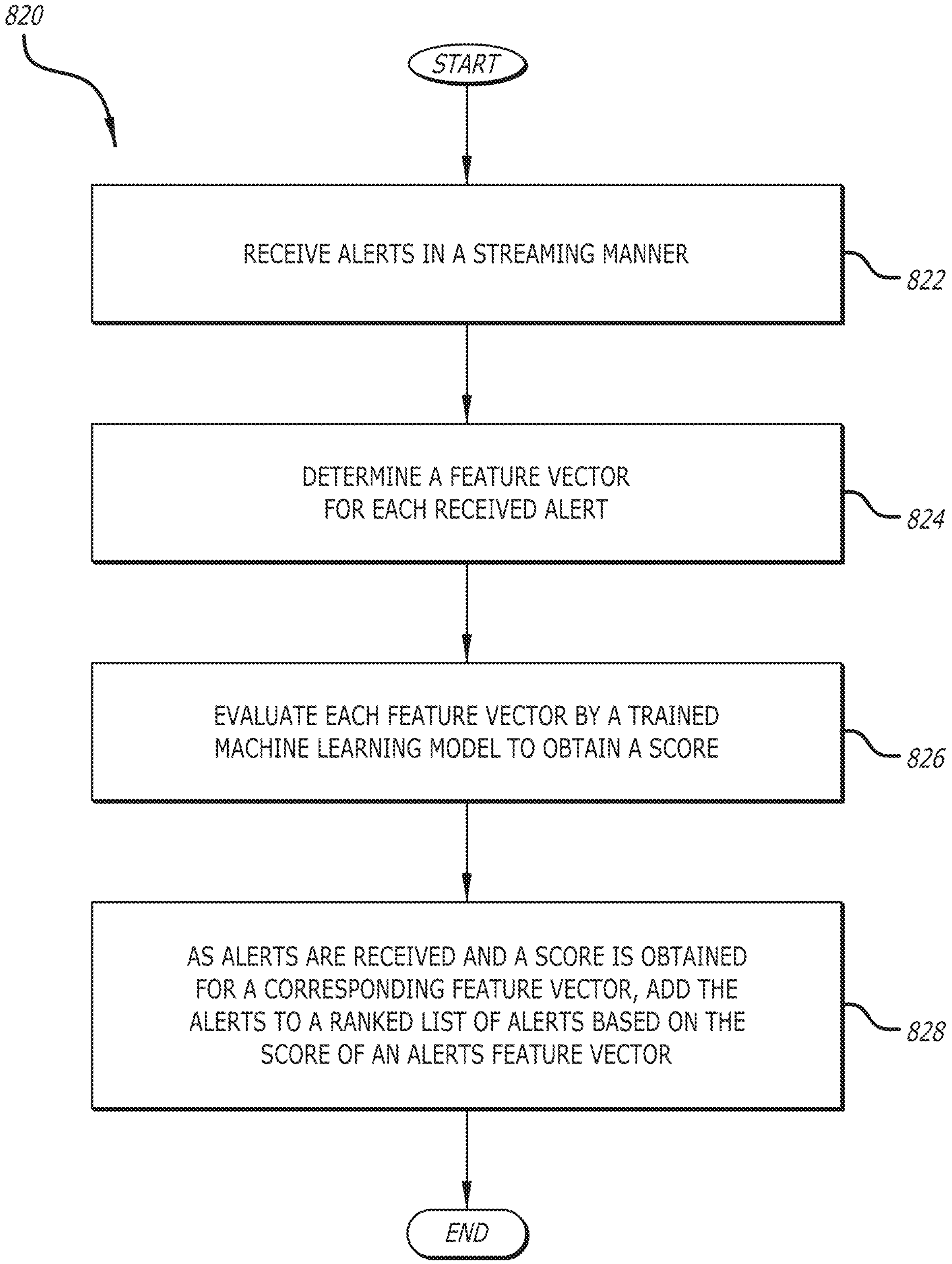
FIG. 8B is a flow diagram illustrating performance of a second embodiment of the deployment of the alert prioritization subsystem in a streaming mode.

Referring now to FIG. 8B, a flow diagram illustrating performance of a second embodiment of the deployment of the alert prioritization subsystem in a streaming mode is shown. In contrast to the methodology of FIG. 8A where a batch of alerts were obtained together (or at least the batch was obtained prior to evaluation of the generated feature vectors by the machine learning model), the methodology of FIG. 8B describes deployment of a machine learning model in a streaming mode. In the streaming mode, the entirety of all alerts to be evaluated need not be obtained prior to evaluation of one or more alerts. Thus, the methodology of FIG. 8B, the method 820, is directed at evaluating alerts using a machine learning model on a rolling basis as alerts are received and inserting the scored alerts into a prioritized listing according to each alert's score.

Each block illustrated in FIG. 8B represents an operation of the method 820. It should be understood that not every operation illustrated in FIG. 8B is required. In fact, certain operations may be optional to complete aspects of the method 820. The method 820 begins with an operation of obtaining alerts in a streaming manner (block 822). Alerts received in a streaming manner may be received continuously over time, where the number of alerts to be evaluated for a given time period is unknown and the interval between receipt of two alerts may also be unknown. Following receipt of each alert, a feature vector is generated for the alert in the same manner as discussed above (block 824). The feature vector is then provided to a trained machine learning model that is configured to determine a score for each alert based on evaluation of the alert's feature vector (block 826). For instance, the machine learning model referenced in FIG. 8B may be the same as that referenced in FIG. 8A, where such a machine learning model may be trained in accordance with the method 700 of FIG. 7.

As each alert is assigned a score based on evaluation of a corresponding feature vector by the machine learning model, the scored alert is added to a prioritized listing that is comprised of previously received and scored alerts (block 828). More particularly, the first alert received and scored is ranked as the highest prioritized alert in the prioritized listing. When a second alert is received and scored, the method 800 either inserts the second alert ahead of the first alert in the prioritized listing (when the score of the second alert indicates a higher priority than does the score of the first alert) or inserts the second alert below the first alert in the prioritized listing (when the score of the first alert indicates a higher priority than does the score of the second alert). This process continues for each subsequently received and scored alert such that the prioritized listing maintains a ranking based on the score assigned to each alert.

Although not shown, as with the method 800, the method 820 may include a step of generating a UI that illustrates the prioritized listing, e.g., the GUI 600 of FIG. 6.

6.3. Feedback Receipt and Retraining Methodology

The description of FIGS. 7-8B above included disclosure of methods for training a machine learning model configured to score alerts and methods for deploying the machine learning model in either a batch mode or a streaming mode to evaluate feature vectors of alerts where the resulting scores are assigned to a corresponding alert where the scored alerts are then ranked to form a prioritized listing. A UI may then be generated that illustrates the prioritized listing. The discussion below describing FIGS. 9A-9E provides embodiments pertaining to receiving user feedback on the prioritized listing either explicitly such as via the UI and/or implicitly via collection of telemetry data. The discussion below further describes embodiments of retraining the machine learning model based on the received user feedback such that the retrained machine learning model may be used to evaluate and score subsequently received alerts.

Figure 9A:
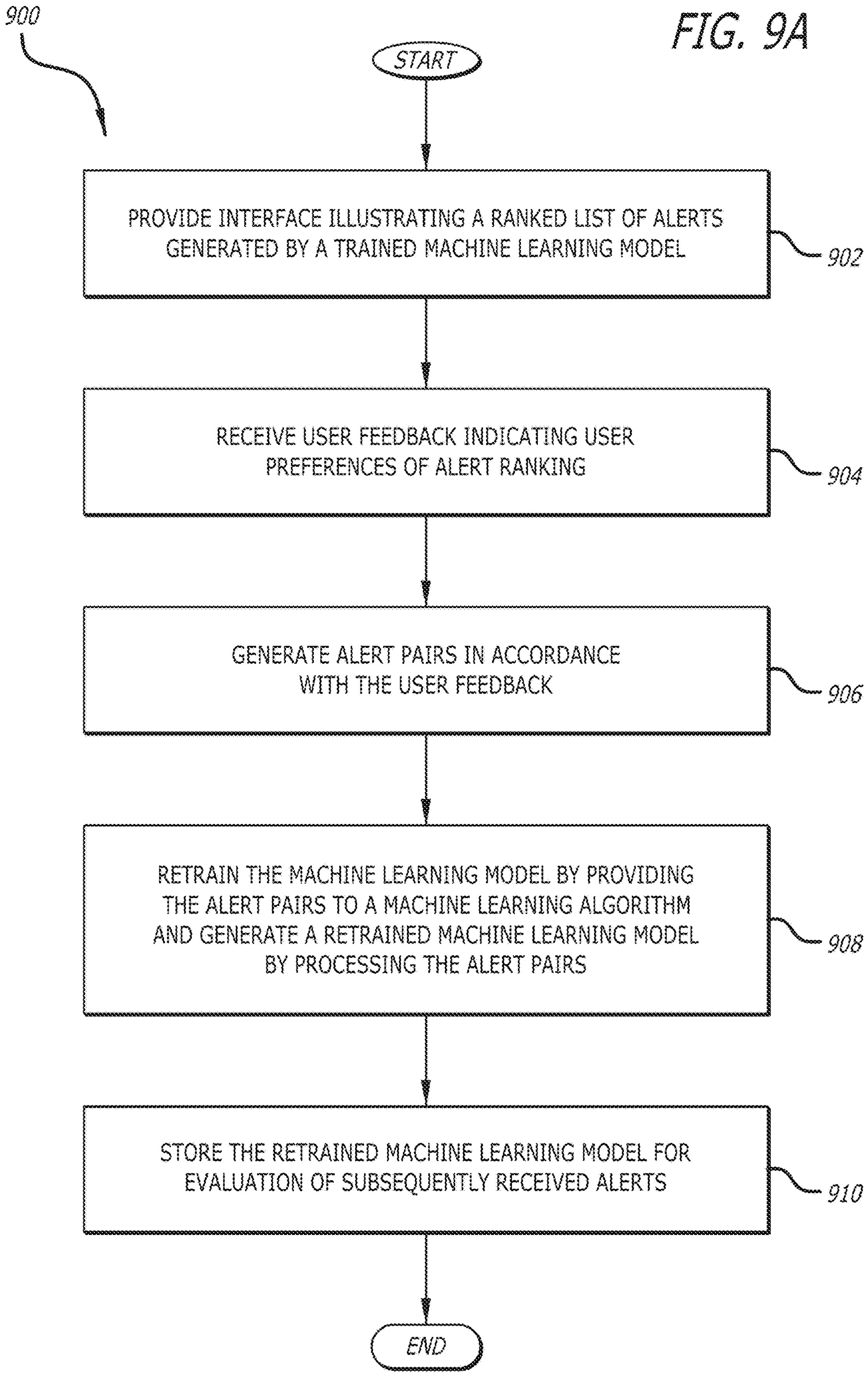
FIG. 9A is a flow diagram illustrating performance of a first embodiment of a retraining methodology of a machine learning model as performed by the alert prioritization subsystem.

Referring now to FIG. 9A, a flow diagram illustrating performance of a first embodiment of a retraining methodology of a machine learning model as performed by the alert prioritization subsystem is shown. Each block illustrated in FIG. 9A represents an operation of the method 900. It should be understood that not every operation illustrated in FIG. 9A is required. In fact, certain operations may be optional to complete aspects of the method 900. The method 900 begins with providing a user interface to a user that illustrates a prioritized listing of alerts based on a score assigned to each alert where the scores are generated by a trained machine learning model (block 902). For instance, the receipt and scoring of the alerts, the generation of the prioritized listing, and the generation of the UI may be done via a combination of FIG. 7 and either (or both) of FIGS. 8A-8B. Providing the UI to a user may encompass causing rendering of the UI on a display screen of a network device.

Following provision of the UI to a user, the method 900 includes receipt of user feedback indicating a user preference pertaining to the prioritized listing (block 904). As discussed throughout this disclosure, user feedback may be received in the form of either explicit feedback and/or implicit feedback. Explicit feedback, discussed further with respect to FIG. 9B, refers to user input that directly represents a user preference (such as activation of either an up/down arrow accompanying each alert in the listing). As an alternative in some embodiments, a user may provide explicit feedback by performing a drag-and-drop operation of an alert from a first position in the prioritized listing to a second position in the prioritized listing. In contrast, implicit feedback refers to feedback that is determined by the alert prioritization subsystem 551 based on actions taken by a user (or not taken by a user) such as, but not limited or restricted to, (i) selecting to view details of alerts out of the order provided by the prioritized listing, (ii) the amount of time spent viewing details of certain alerts compared to the time spent viewing details of other alerts, (iii) remediation actions taken for certain alerts compared to remediation actions taken (or not taken) for other alerts, etc.

Following receipt of user feedback, the method 900 continues with generation of alert pairs in accordance with the user feedback (block 906). In particular, generation of the alert pairs includes a pair of alerts that are labeled as to which alert is to be prioritized over the other in accordance with the user feedback. In some embodiments, the alert pairs may comprise a pair of feature vectors that correspond to the alerts.

Figure 9B:
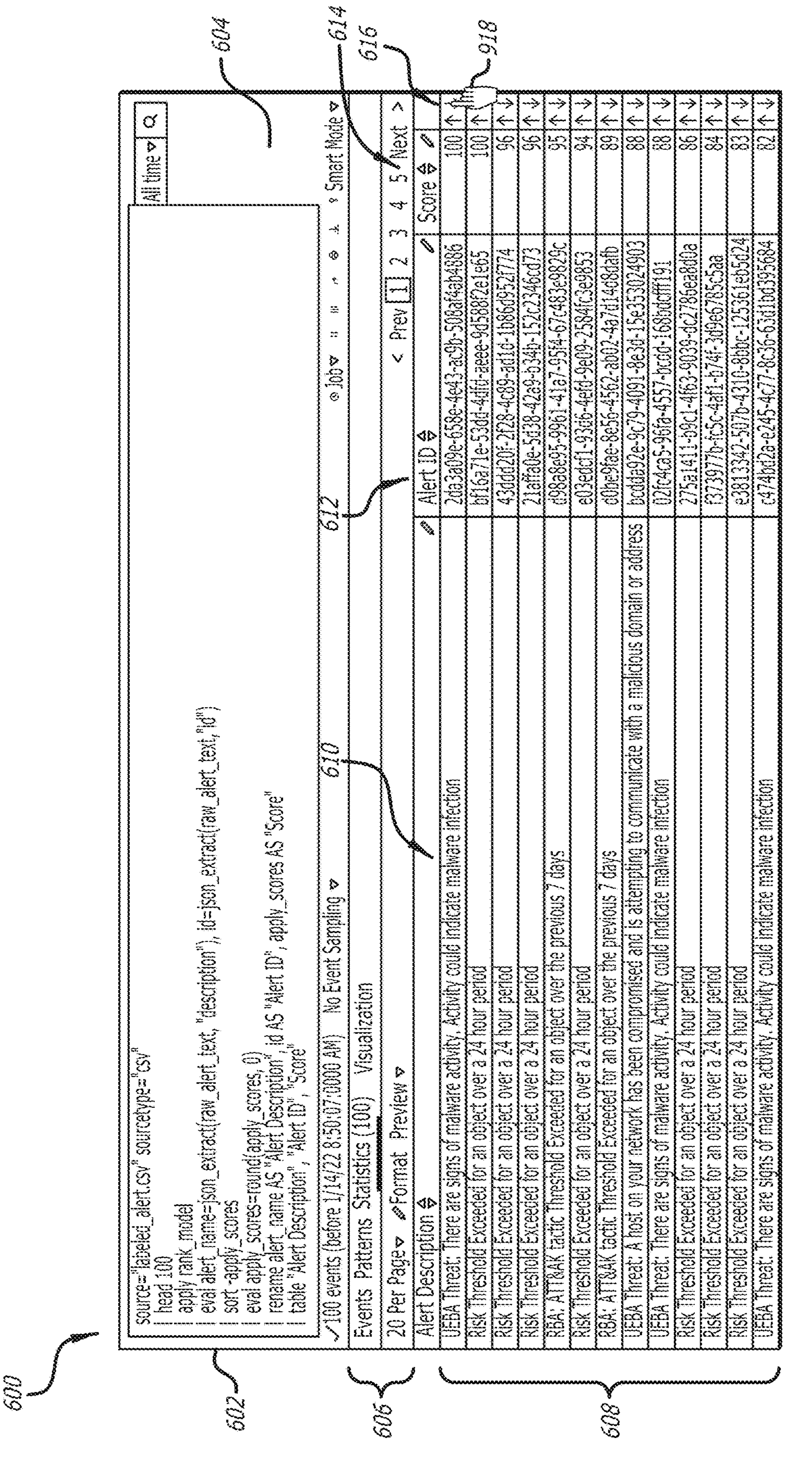
FIG. 9B is one embodiment of the user interface of FIG. 6 providing an illustrative representation of receipt of user feedback.
Figure 9C:
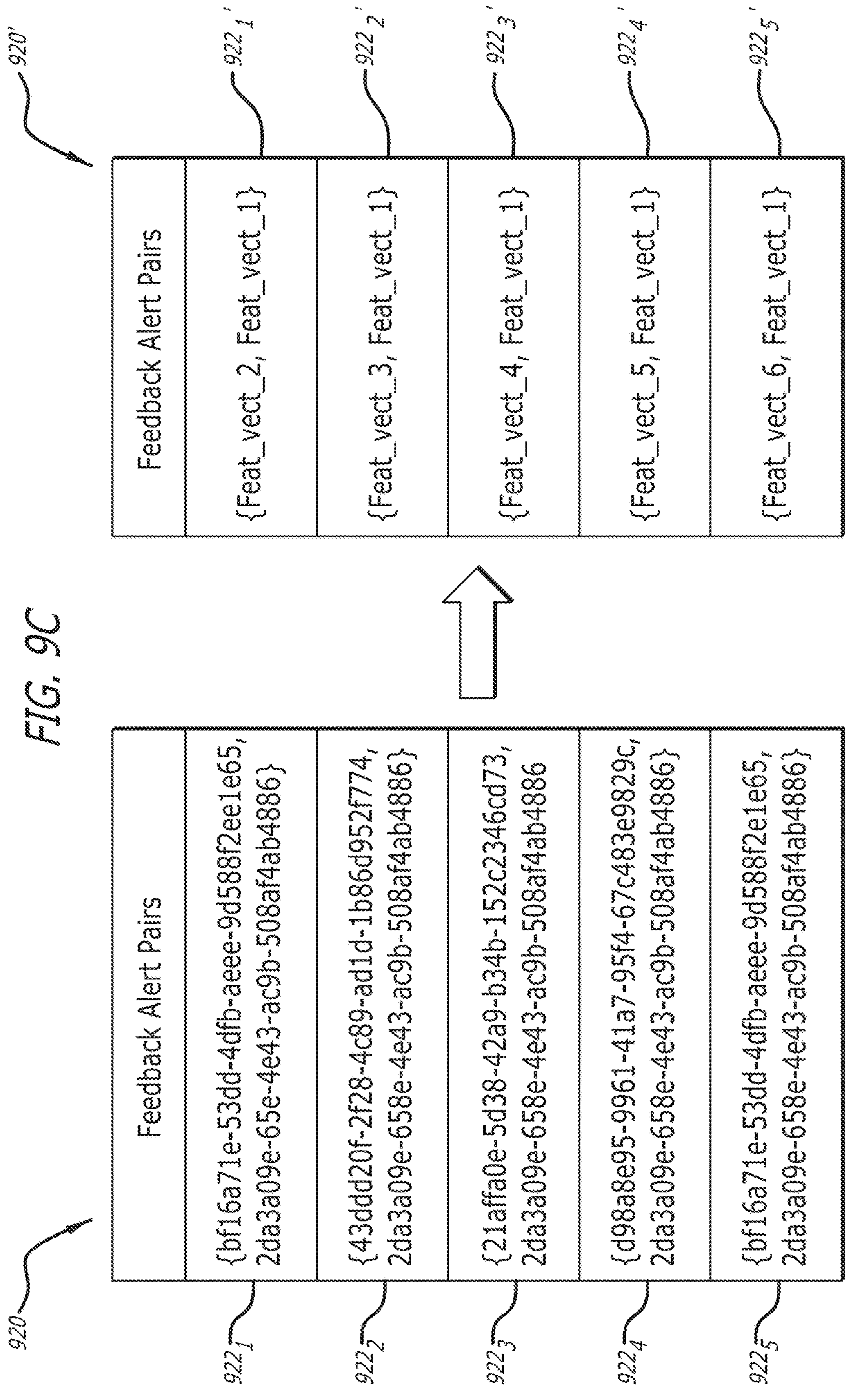
FIG. 9C is an illustrative representation of feedback alert pairs generated in response to receipt of the user feedback as shown in FIG. 9B.

In some embodiments, a first step of generating the alert pairs may be to populate a vector with a representation of two alerts, e.g., alert identifiers, which may resemble: {alert1_id; alert2_id}, where the ordering of the alerts indicates the prioritization labeling in accordance with the user feedback (e.g., alert1 is to have a higher priority than alert2 based on user feedback) (see FIG. 9C). A second step of generating the alert pairs may be to replace the representation of each alert with a feature vector corresponding to the alert.

Additionally, generation of alert pairs may also be in accordance with rules that utilize the current ranking of the implicated alerts. In some embodiments, generation of an alert pair (for retraining) requires both the user feedback (implicit or explicit) as well as the current prioritized listing (ranking) of the alerts as presented to the user such that an alert pair is only generated based on the user feedback when the ranking of the alerts satisfy ordering rules. For example, one rule may include generation of the alert pair {Alert_B, Alert_A} (e.g., user prefers Alert_B to Alert_A) when user input was received selecting Alert_B but not received selecting Alert_A, only when Alert_B is currently ranked lower than Alert_A. The last clause (only when Alert_B is ranked below Alert_A) is useful for combatting "click bias," which refers to users being biased towards clicking higher ranked results and against clicking lower ranked results irrespective of the utility of the alerts themselves.

In forming the alert pairs, an alert that received negative feedback will appear as the lower priority alert in the alert pairings. Conversely, an alert that received positive feedback will appear as the higher priority alert in the alert pairings. An example of receipt of negative feedback is illustrated in and discussed with respect to FIGS. 9B-9C.

Following generation of the alert pairs, the machine learning model is retrained using the alert pairs, where the alert pairs are provided as a labeled training data set to the machine learning algorithm as discussed in FIG. 7. In some embodiments, the retraining may entail incremental retraining based on alert pairs generated in response to receipt of user feedback (explicit and/or telemetry data) as discussed below.

FIG. 9B is one embodiment of the user interface of FIG. 6 providing an illustrative representation of receipt of user feedback. FIG. 9B illustrates one example of explicit feedback through receipt of user input to a UI element (an activatable arrow icon) 616. In particular, FIG. 9B illustrates a hand cursor icon 918 activating the down arrow 616 associated with the alert ranked first in the prioritized listing of FIG. 9B, which represents that the user has explicitly provided negative feedback for the ranking of the alert having Alert_ID "2da3a09e-65e-4e43-ac9b-508af4ab4886." This explicit negative feedback, feedback 596, is received by the feedback receiving component 595 of the alert prioritization subsystem 551 (see FIG. 5C). Any user feedback may be stored in the feedback storage 596.

Referring now to FIG. 9C, an illustrative representation of feedback alert ID pairs generated in response to receipt of the user feedback of FIG. 9B is shown. The listing 920 provides a plurality of alert pairs $922_1$-$922_5$ (collectively referred to as alert pairs 922) as in a first state (e.g., utilizing alert IDs) for illustrative purposes and does not show every possible feedback alert pair. For example, the feedback alert pair $922_1$ is comprised of two alert IDs corresponding to the first two ranked alerts in the prioritized listing of FIG. 9B. Further, the ordering of the alert IDs in the feedback alert pair $922_1$ indicates a labeling such that the first alert ID has a higher priority than the second alert ID in accordance with the user feedback shown in FIG. 9B. As discussed above, the generation of the feedback alert pairs utilizing alert IDs may be a first step in generating the labeled training data that will be utilized in retraining the machine learning model that scores each alert.

Thus, the listing 920' provides the plurality of alert pairs 922 in a second state ($922_1$'-$922_5$', collectively 922'), e.g., utilizing the feature vectors corresponding to the alert IDs of the listing 920. In some embodiments, the feature vectors for each alert in the listing 920 may be retrieved from storage, e.g., from the alert storage 580 of FIG. 5C. As noted above, the feature vectors generated for an alert may be stored upon generation (e.g., prior to evaluation/scoring of the alert by the machine learning model). In other embodiments in which the feature vectors are not stored, the alerts may be retrieved from the alert storage 580 and the feature vectors for each alert may be generated in accordance with the disclosure provided above. The machine learning model may then be retrained by providing the listing 920' (representing label training data) to a machine learning algorithm for generating a retrained machine learning model.

In some embodiments, the retraining is performed in response to receipt of user feedback (explicit or implicit) utilizing the alert pairs generated based on the user feedback. In some embodiments, the training data used in the retraining consists solely of these alert pairs (i.e., no additional alert pairs generated from historical data). In such embodiments, the retraining results in an updating of weights (i.e., the retraining is not equivalent to a full training of a model). Instead, one or more of the weights of an existing model are tuned (e.g., to reflect the user preference represented by the alert pairs but avoiding substantial deviation from the current model behavior).

As should be understood, the user feedback is interpreted by the alert prioritization subsystem 551 as that the user prefers one alert to be prioritized higher/lower than shown. Thus, the retraining process seeks to generate labeled training data that represents this. To this effect, the feedback alert pairs represent the user's preference for an alert to have a higher or lower priority. As a result of retraining the machine learning model using the feedback alert pairs, subsequently received alerts are evaluated/scored in accordance with the received user feedback.

Further, the alert prioritization subsystem 551 may interpret each type of user feedback differently, e.g., different types of user feedback may indicate different strengths in the user's preference. For example, explicit feedback may be interpreted to mean that the user would have preferred that a particular alert appeared a first predefined number of spaces higher or lower in the prioritized listing (e.g., resulting in generation of a first number of alert pairs). Similarly, implicit feedback may be interpreted to mean that the user would have preferred that a particular alert appeared a second predefined number of spaces higher or lower in the prioritized listing, where the second predefined number of spaces is less than the first predefined number of spaces (e.g., resulting in generation of a second number of alert pairs less than the first number). Additionally, as there are numerous types of implicit feedback discussed above, the interpretation of the strength of the user's preference may differ for each type of implicit feedback. In other words, explicit feedback may be interpreted to cause a more drastic change in the scoring of subsequently received alerts than implicit feedback.

Thus, in some embodiments, the number of feedback alert pairs generated as a result of explicit feedback may be a first predetermined number and the number of feedback alert pairs generated as a result of a first type of implicit feedback may be a second predetermined number where the second predetermined number is less than the first predetermined number. Such a configuration results in a more drastic change in the scoring of subsequently received alerts when explicit feedback is received than when implicit feedback is received.

In addition, in some embodiments, a degree of confidence is assigned to each type of user feedback received, where the degree of confidence affects the amount that weights are adjusted during retraining. For example, explicit user feedback approving the placement of an alert on a prioritized listing may be associated with a first confidence score (e.g., 0.80) such that when retraining is performed based on the approval, the weights are adjusted in accordance with the first confidence score. Continuing the example, explicit user feedback of dragging and alert an alert from one placement to another on a prioritized listing may be associated with a second confidence score (e.g., 0.99) such that when retraining is performed based on the disapproval, the weights are adjusted in accordance with the second confidence score. Further continuing the example, implicit user feedback based on telemetry data of the number of clicks associated with viewing a first alert as compared to the number of clicks associated with viewing a second alert may be associated with a third confidence score (e.g., 0.30) such that when retraining is performed based on the number of clicks, the weights are adjusted in accordance with the third confidence score. What the above example illustrates is that different confidence scores may be assigned to different types of user feedback representing how likely the adjustment of the weights during retraining represents the user's intent. For example, experiential data may show that an approval provides a high likelihood that the user intends for the ranking of the corresponding alert to increase substantially whereas drag-and-drop user feedback leaves little doubt as to the user's intent. Further, implicit feedback based on the number of clicks on an alert may imply viewing the alert was valuable to the user, and thus the alert should be prioritized higher than others; however, while fewer clicks may imply an alert is to have a lower priority, it may also mean a user efficiently resolved an important alert with which he/she is familiar.

Figure 9D:
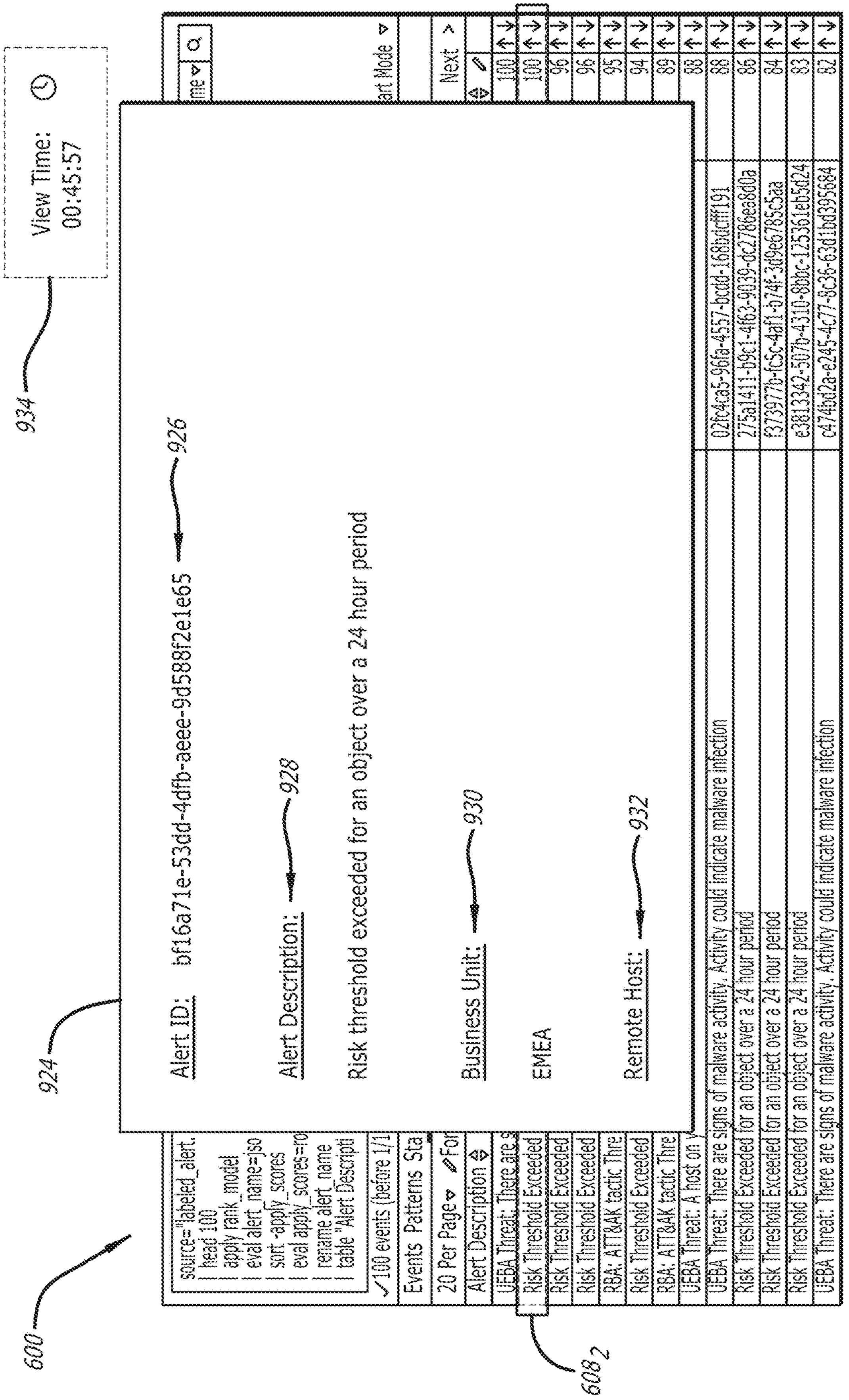
FIG. 9D is a first embodiment of the user interface of FIG. 6 illustrating collection of telemetry data based on view time of a first alert.
Figure 9E:
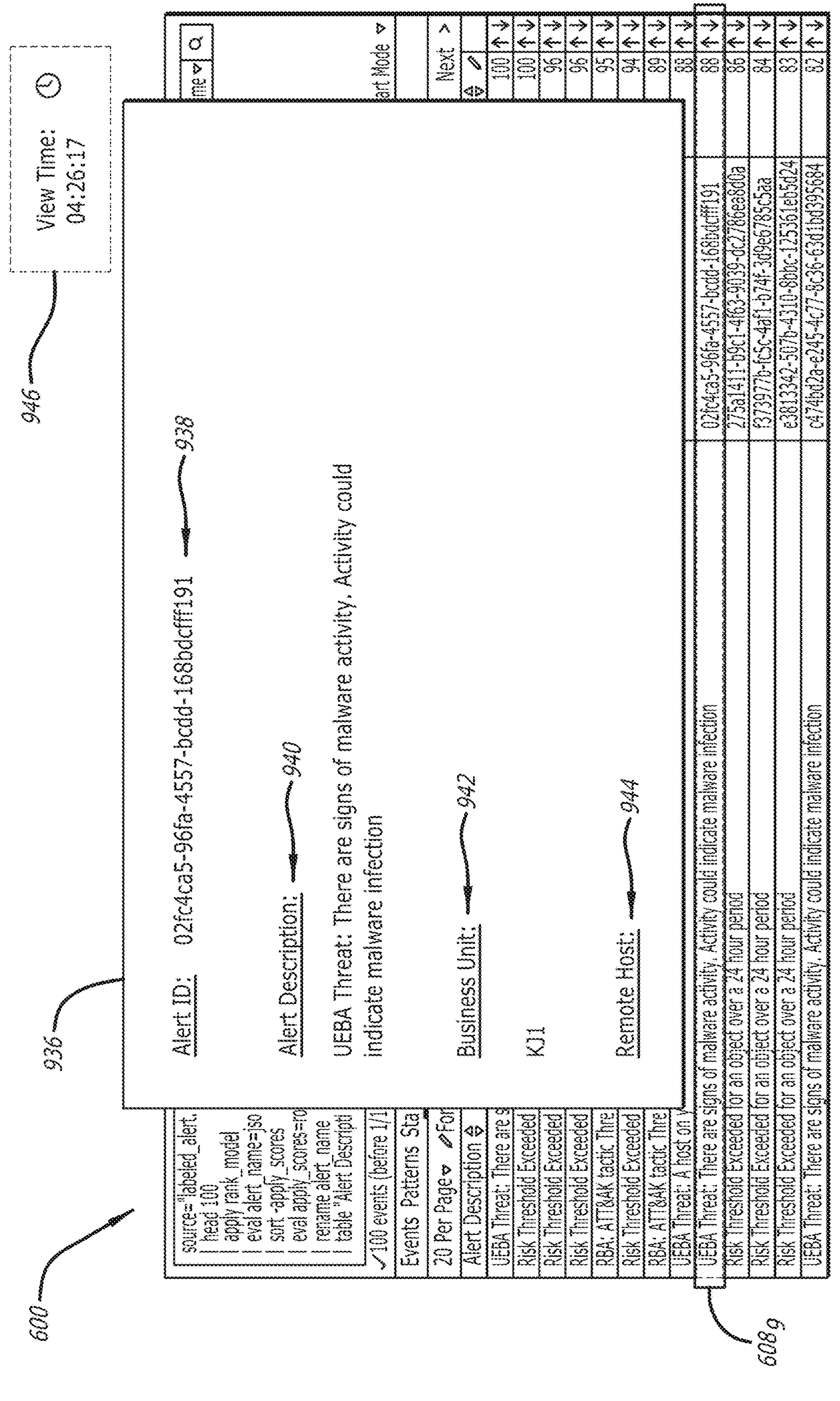
FIG. 9E is a second embodiment of the user interface of FIG. 6 illustrating collection of telemetry data based on view time of a second alert.

FIG. 9D is a first embodiment of the user interface of FIG. 6 illustrating collection of telemetry data based on view time of a first alert and FIG. 9E is a second embodiment of the same. FIG. 9D illustrates the GUI 600 of FIG. 6 behind an alert detail popup 924 that provides alert details for a selected alert (e.g., the alert 608$_2$). The alert detail popup 924 includes information pertaining to the alert 608$_2$, which may be used in the alert's feature vector, and includes but is not limited or restricted to, an alert ID 926, an alert description 928, a business unit 930, a remote host 932, etc. It is noted that the alert detail popup 924 may be scrollable such that additional information (e.g., details of the remote host 932) is displayed upon scrolling. Similarly, the alert details popup of FIG. 9E includes information pertaining to the alert 608$_9$, but is not limited or restricted to, an alert ID 938, an alert description 940, a business unit 940, a remote host 944, etc.

Referring again to FIG. 9D, the figure further includes an illustrative representation of the collection of telemetry data 934, which is translated into implicit feedback. As shown, the telemetry data 934 corresponds to a view time of the alert details popup 924. As noted above, the time spent viewing alert details may translate into one type of implicit feedback as the amount of time a user spends viewing alert details may correspond to the priority of this particular alert to the user. For instance, the alert prioritization subsystem 551 may translate certain view times into implicit feedback, which is then used to generate feedback alert pairs as discussed above.

As one example, a view time above a predefined threshold may be translated by the alert prioritization subsystem 551 into implicit feedback that the particular alert is a priority to the user and as a result, generate feedback alert pairs for retraining of a machine learning model that scores subsequently received alerts.

As a second example and with reference to FIG. 9E, the view times of two alerts may be compared to imply that the alert that was viewed for a greater amount of time is a higher priority alert to the user (or be one factor in such a determination). FIG. 9E, which provides an illustration of an alert details popup 936 corresponding to the alert 608$_9$, shows the capture of telemetry data 946 (view time). Thus, the alert prioritization subsystem 551 may compare the telemetry data 934 to the telemetry data 946 to determine that the user prioritizes the alert 608$_9$ over the alert 608$_2$. As a result, the alert prioritization subsystem 551 may generate alert feedback pairs indicating either (or both): (i) the alert 608$_9$ is preferred (e.g., prioritized) over all alerts currently prioritized below and including alert 608$_2$, or (ii) the alert 608$_2$ is preferred less than all alerts currently prioritized above and including alert 608$_9$.

6.4. Issue Prioritization Methodology

Figure 10:
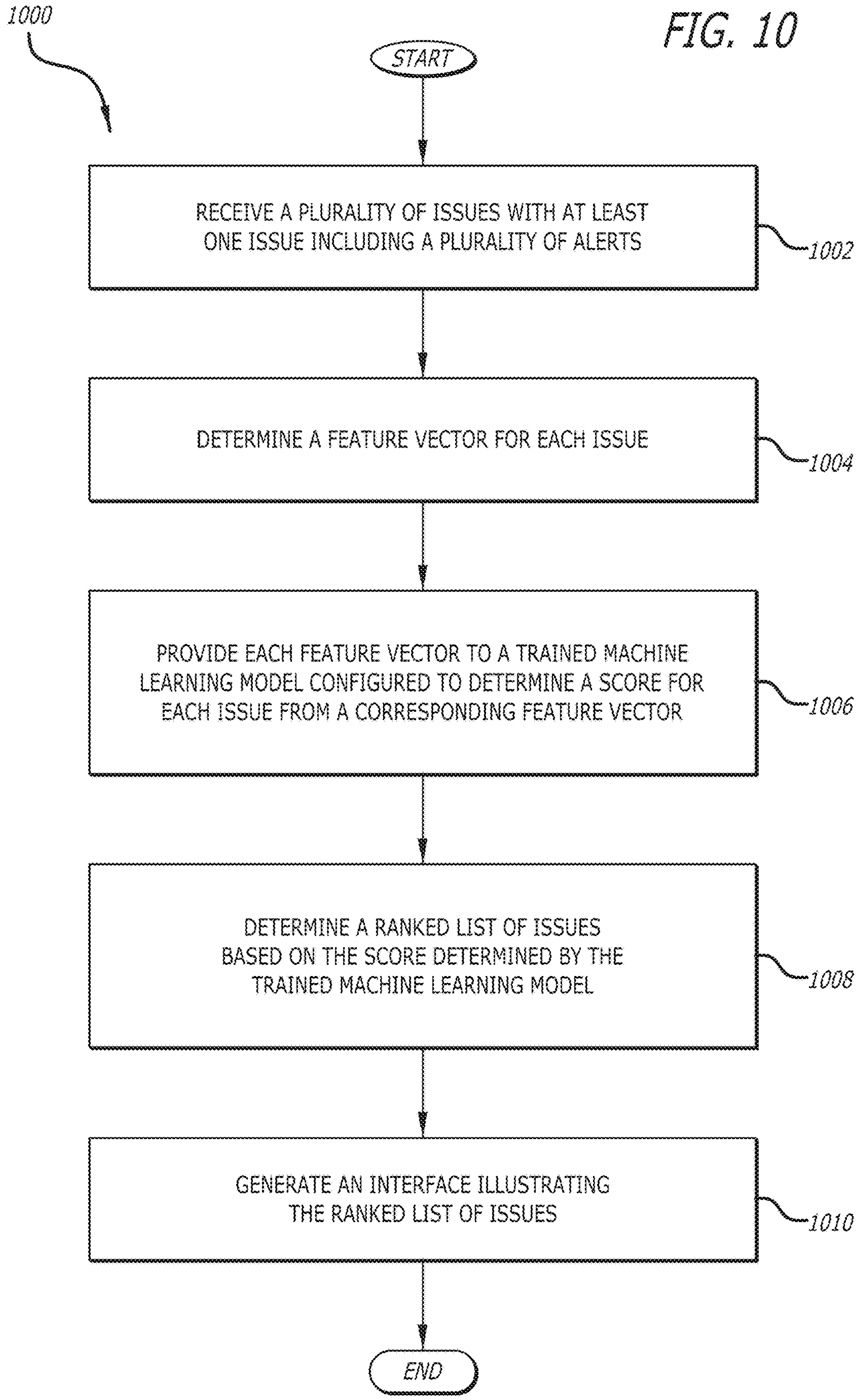
FIG. 10 is a flow diagram illustrating performance of deployment of the alert prioritization subsystem to generate a prioritization listing of issues.

FIG. 10 is a flow diagram illustrating performance of deployment of the alert prioritization subsystem to generate a prioritization listing of issues. Each block illustrated in FIG. 10 represents an operation of the method 1000. It should be understood that not every operation illustrated in FIG. 10 is required. In fact, certain operations may be optional to complete aspects of the method 1000. The method 1000 begins with obtaining a plurality of issues with at least one issue including a plurality of alerts (block 1002). After obtaining the plurality of issues, a feature vector for each issue is generated (block 1004).

In some embodiments, all alerts will have the same fields such that the fields may be statistically aggregated to form a field of the issue, where the feature vector of the issue is derived from such fields. For example, an issue may be comprised of ten alerts that include a numerical field corresponding to a data reading from a particular sensor. The feature vector for the issue may include a feature corresponding to the data reading from the particular sensor and the value of the feature for the issue is a statistical aggregation of the value of the field for each of the ten alerts. In some embodiments, the statistical aggregation may be any of a mean, median, or mode. The value of the issue's feature for a temporal field would be determined in a similar manner. Categorical fields are numerically (one-hot) encoded, so statistical aggregation of the categorical fields may be performed in the same manner, e.g., by generating any of a mean, median, or mode.

For example, an issue may include two alerts, one from source_A and the other from source_B. The first alert will have a 1 for the feature that encodes whether the source is source_A and a 0 for the feature that encodes whether the source is source_B; vice versa for the second alert. Taking the mean would give the issue feature vector a value of 0.5 for both fields. This equivalently gives the proportion of alerts in the issue which are from that specific source (or any other categorical attribute).

As an alternative, the score for an issue's feature vector may be based on the individual scores of the alerts assigned to the issue. For example, when determining the score of a first issue, the feature vector of each alert assigned to the first issue is scored with the score of the first issue being taken as the score indicating a highest priority. Such would avoid the scoring of an issue having a very high priority alert to be diluted by a large number of low priority alerts.

Following generation of the feature vectors for each of the plurality of issues, the feature vectors are provided to a trained machine learning model configured to evaluate and score the feature vectors, where the machine learning model may be trained in accordance with the method 700 of FIG. 7 (and trained using feature vectors of issues) and operate in accordance with the operations discussed above with respect to at least FIGS. 8A-9D. From the score assigned to each issue, a prioritized listing of the issues is generated and a user interface (UI) illustrating such is subsequently generated (blocks 1008, 1010). As mentioned above, one example of a UI that may be generated to illustrate the prioritized listing is the GUI 600 of FIG. 6. Feedback for the prioritized listing of the issues may be received in any of the manners discussed above and the machine learning model may be retrained in accordance therewith as also discussed above.

7.0. Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory storage medium. Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory storage medium that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computerized method comprising:

generating a graphical user interface (GUI) that displays a listing of a plurality of alerts based on a score generated for each of the plurality of alerts by a machine learning model, wherein the score for each of the plurality of alerts indicates a priority of each alert;

obtaining user feedback on the listing of the plurality of alerts through user interaction with the GUI, wherein the user feedback comprises either explicit feedback or implicit feedback;

retraining the machine learning model based on the user feedback, wherein the retraining of the machine learning model includes:

generating a set of labeled alert pairs based on the user feedback, wherein a labeled alert pair includes a first alert, a second alert, and an indication as to which of the first alert or the second alert is a higher priority in accordance with the user feedback, and providing a multi-layer neural network with the set of labeled alert pairs, wherein forward propagation is performed for alerts associated with a first labeled alert pair producing an output value for each alert of the first labeled alert pair, and a loss based on a difference between the output values is back-propagated into the multi-layer neural network resulting in computation of a model gradient and updating of a weighting scheme of the multi-layer neural network; and evaluating subsequently received alerts with the retrained machine learning model.

2. The computerized method of claim 1, wherein the GUI displays the listing of the plurality of alerts in as a prioritized listing based on the score generated for each of the plurality of alerts.

3. The computerized method of claim 1, wherein the user feedback is the implicit feedback, and the implicit feedback is automatically determined based on collected telemetry data.

4. The computerized method of claim 3, wherein the implicit feedback includes one or more of:

an amount of time a user views a first alert in comparison to an amount of time a second alert is viewed, an order in which alerts are viewed, whether a first action is taken for a first alert while a second action is not taken for another alert, wherein the first action is either the same or different than the second action, or a number of times the first alert is viewed within a given time frame.

5. The computerized method of claim 1, wherein the user feedback is the implicit feedback, and wherein the explicit user feedback indicates either approval or disapproval of a placement of an alert within the listing of a plurality of alerts.

6. The computerized method of claim 1, wherein the difference between the output values for each labeled alert pair is provided to a sigmoid node, and the loss corresponds to a cross entropy loss.

7. A computing device, comprising:

one or more processors; and a non-transitory computer-readable medium having stored thereon instructions that, when executed by the processor, cause the processor to perform operations including:

generating a graphical user interface (GUI) that displays a listing of a plurality of alerts based on a score generated for each of the plurality of alerts by a machine learning model, wherein the score for each of the plurality of alerts indicates a priority of each alert, obtaining user feedback on the listing of the plurality of alerts through user interaction with the GUI, wherein the user feedback comprises either explicit feedback or implicit feedback, retraining the machine learning model based on the user feedback, wherein the retraining of the machine learning model includes:

generating a set of labeled alert pairs based on the user feedback, wherein a labeled alert pair includes a first alert, a second alert, and an indication as to which of the first alert or the second alert is a higher priority in accordance with the user feedback, and providing a multi-layer neural network with the set of labeled alert pairs, wherein forward propagation is performed for alerts associated with a first labeled alert pair producing an output value for each alert of the first labeled alert pair, and a loss based on a difference between the output values is back-propagated into the multi-layer neural network resulting in computation of a model gradient and updating of a weighting scheme of the multi-layer neural network, and evaluating subsequently received alerts with the retrained machine learning model.

8. The computing device of claim 7, wherein the GUI displays the listing of the plurality of alerts in as a prioritized listing based on the score generated for each of the plurality of alerts.

9. The computing device of claim 7, wherein the user feedback is the implicit feedback, and the implicit feedback is automatically determined based on collected telemetry data.

10. The computing device of claim 9, wherein the implicit feedback includes one or more of:

an amount of time a user views a first alert in comparison to an amount of time a second alert is viewed, an order in which alerts are viewed, whether a first action is taken for a first alert while a second action is not taken for another alert, wherein the first action is either the same or different than the second action, or a number of times the first alert is viewed within a given time frame.

11. The computing device of claim 7, wherein the user feedback is the implicit feedback, and wherein the explicit user feedback indicates either approval or disapproval of a placement of an alert within the listing of a plurality of alerts.

12. The computing device of claim 7, wherein the difference between the output values for each labeled alert pair is provided to a sigmoid node, and the loss corresponds to a cross entropy loss.

13. A non-transitory storage medium having stored thereon instructions that, when executed, cause performance of operations including:

generating a graphical user interface (GUI) that displays a listing of a plurality of alerts based on a score generated for each of the plurality of alerts by a machine learning model, wherein the score for each of the plurality of alerts indicates a priority of each alert, obtaining user feedback on the listing of the plurality of alerts through user interaction with the GUI, wherein the user feedback comprises either explicit feedback or implicit feedback, retraining the machine learning model based on the user feedback, wherein retraining the machine learning model includes:

generating a set of labeled alert pairs based on the user feedback, wherein a labeled alert pair includes a first alert, a second alert, and an indication as to which of the first alert or the second alert is a higher priority in accordance with the user feedback, and providing a multi-layer neural network with the set of labeled alert pairs, wherein forward propagation is performed for alerts associated with a first labeled alert pair producing an output value for each alert of the first labeled alert pair, and a loss based on a difference between the output values is back-propagated into the multi-layer neural network resulting in computation of a model gradient and updating of a weighting scheme of the multi-layer neural network, and evaluating subsequently received alerts with the retrained machine learning model.

14. The non-transitory storage medium of claim 13, wherein the GUI displays the listing of the plurality of alerts in as a prioritized listing based on the score generated for each of the plurality of alerts.

15. The non-transitory storage medium of claim 13, wherein the user feedback is the implicit feedback, and the implicit feedback is automatically determined based on collected telemetry data, and wherein the implicit feedback includes one or more of:

an amount of time a user views a first alert in comparison to an amount of time a second alert is viewed, an order in which alerts are viewed, whether a first action is taken for a first alert while a second action is not taken for another alert, wherein the first action is either the same or different than the second action, or a number of times the first alert is viewed within a given time frame.

16. The non-transitory storage medium of claim 13, wherein the user feedback is the implicit feedback, and wherein the explicit user feedback indicates either approval or disapproval of a placement of an alert within the listing of a plurality of alerts.

17. The non-transitory storage medium of claim 13, wherein the difference between the output values for each labeled alert pair is provided to a sigmoid node, where the loss corresponds to a cross entropy loss.

* * * * *